United States Patent [19]
Tsuji et al.

[11] Patent Number: 4,696,553
[45] Date of Patent: Sep. 29, 1987

[54] ZOOM LENS HAVING A LARGE ZOOM RATIO

[75] Inventors: Sadahiko Tsuji, Kanagawa; Sadatoshi Takahashi, Tokyo; Kazuo Fujibayashi, Kanagawa, all of Japan

[73] Assignee: Canon Kabushiki Kaisha

[21] Appl. No.: 471,839

[22] Filed: Mar. 3, 1983

[30] Foreign Application Priority Data

| Mar. 4, 1982 | [JP] | Japan | 57-34206 |
| Mar. 9, 1982 | [JP] | Japan | 57-37435 |
| Mar. 23, 1982 | [JP] | Japan | 57-45778 |
| Mar. 23, 1982 | [JP] | Japan | 57-45779 |
| Apr. 15, 1982 | [JP] | Japan | 57-62851 |

[51] Int. Cl.$^4$ .............................. G02B 15/20
[52] U.S. Cl. ..................... 350/427; 350/423
[58] Field of Search ............ 350/423, 427, 428

[56] References Cited

U.S. PATENT DOCUMENTS

| 4,232,942 | 11/1980 | Ikemori | 350/423 |
| 4,377,325 | 3/1983 | Hiroshi et al. | 350/423 |
| 4,451,124 | 5/1984 | Basista et al. | 350/427 |
| 4,494,828 | 1/1985 | Masumoto et al. | 350/423 X |
| 4,501,475 | 2/1985 | Fujita et al. | 350/423 X |
| 4,506,958 | 3/1985 | Imai | 350/423 X |
| 4,515,446 | 5/1985 | Takahashi et al. | 350/427 |

FOREIGN PATENT DOCUMENTS 161824 10/1982 Japan ..................... 350/423

Primary Examiner—John K. Corbin
Assistant Examiner—Scott J. Sugarman
Attorney, Agent, or Firm—Toren, McGeady & Associates

[57] ABSTRACT

A zoom lens having at least four components of which the 1st counting from the object side is of positive power, the 2nd is of negative power and the 3rd and 4th are of positive or negative power, wherein the 2nd component is made fixed, and the 1st component and at least one of those that follow the 2nd component are made movable for zooming, whereby the bulk and size of the lens system is minimized, while still permitting good correction of aberrations.

11 Claims, 114 Drawing Figures

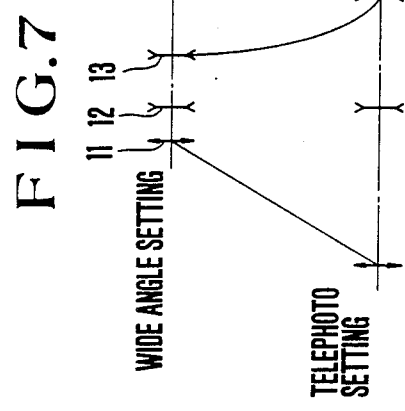
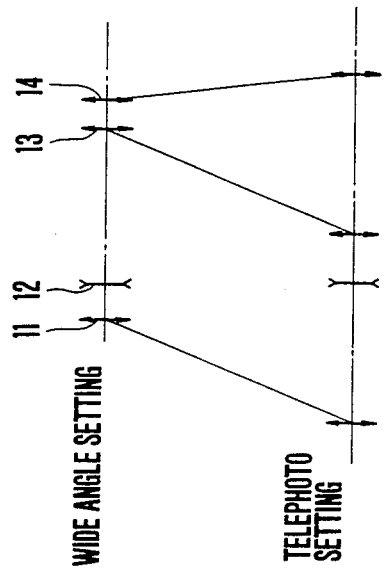
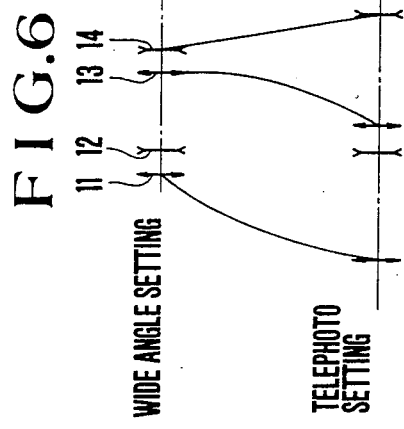
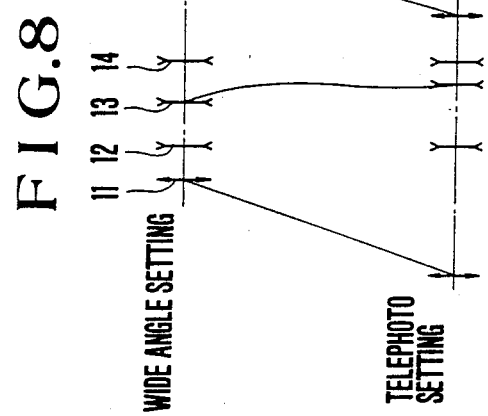

SPHERICAL ABERRATION

ASTIGMATISM

DISTORTION(%)

SPHERICAL ABERRATION

ASTIGMATISM

DISTORTION(%)

SPHERICAL ABERRATION

ASTIGMATISM

DISTORTION(%)

ZOOM LENS HAVING A LARGE ZOOM RATIO

BACKGROUND OF THE INVENTION

1. Field of the Invention:

This invention relates to zoom lenses suited for use in still cameras, cine cameras, video cameras or the like, and more particularly to zoom lenses having a large zoom ratio with a high relative aperture and a compact form.

2. Description of the Prior Art:

Conventionally, four lens components constituting a zoom lens system, or in the so-called 4-component zoom lens, are arranged as represented by a thin lens system of FIG. 1, so that when zooming, the 2nd component 2 counting from the object side is moved axially to change the image magnification, and the 3rd component 3 is simultaneously moved axially to compensate for the image shift, as is well known to those skilled in the art. As examples of this, mention may be made of those disclosed in Japanese Pat. Nos. Sho 39-6128 and 39-13841, and U.S. Pat. No. 2,847,907. These lens systems each comprise, as has been stated above, the 1st component 1 which remains stationary during zooming, followed by the 2nd component 2 having a strong negative refractive power and axially movable in a large range to effect variation of the image magnification, and the 3rd component 3 of positive or negative power axially movable to effect compensation for the shift of the image plane 5 resulting from the change of the image magnification followed by a positive or negative 4th component 4 by which an image of an object is formed.

With such zooming arrangement, when to increase the relative aperture of that zoom lens, the 1st component 1 is given a positive refractive power, for, as the light bundle is converged, the heights of incidence of light rays on the 2nd through 4th components from the optical axis are lowerd, to thereby facilitate correction of aberrations. In order for the 2nd component to accomplish the image magnification variation, it is effective to give the 2nd component a strong negative refractive power. The conventional zoom lens has the provision of the strong negative power in this or 2nd component and makes use of this component as the variator. It is, therefore, possible to reduce the total axial movement while preserving the large zoom ratio. On the other hand, however, concerning the accuracy to which the 2nd component is positioned, there is a drawback that the tolerance of the design parameters of the operating mechanism therefor becomes severe. A further increase in the refractive power for facilitating achievement of an advance in the compactness results in the need for a more stringent precision accuracy manufacturing technique.

In Japanese Laid-Open Patent Application No. Sho 57-5012, this or 2nd component is shown as remaining stationary during zooming. However, this patent with the specific example of the stationary 2nd component reveals that when zooming from the wide angle to the telephoto position, the image magnification of the 2nd component varies in a range of from $-0.468$ to $-0.782$, or from $-0.351$ to $-0.556$. This implies that the 2nd component is used in providing a relatively low image magnification. Therefore, the magnificating changing efficiency was poor, giving a low zoom ratio, and the bulk and size of the lens system was not sufficiently reduced.

Also, in Japanese Patent Application No. Sho 39-6128, the 3rd component is made fixed, but the 4th component is made movable axially to effect image shift compensation, and the 5th component is given the image forming function Since these conventional examples have the zooming provision in the components of strong refractive powers, for a given range is obtained, a lesser total movement suffices, being advantageous at a minimization of the bulk and size. However, the operating mechanism for the very powerful components must be manufactured within a severe precision accuracy. In addition to this disadvantage, when the refractive power of the component is further increased for the purpose of minimizing the bulk and size, a severer accuracy is required. This is valid even in the zoom lenses having an increased number of zoom components, for example, that disclosed in Japanese Laid-Open Patent Application No. Sho 50-149360.

It is further known to provide a zoom lens in which while the 2nd component is moved axially to effect variation of the image magnification, the 1st and 3rd components are moved axially as a unit to effect image shift compensation. As this type zoom lens mention may be made of those disclosed in Japanese Pat. Nos. Sho 41-13667, 44-14877 and 45-8840 wherein, as has been stated above, the 2nd component axially moving has the image magnification varying function which is heightened by the 1st component when made to axially move in differential relation to the 2nd component, and wherein the 1st and 3rd components are made to move axially as a unit in a non-linear path to maintain the constant position of the image plane, and the following or 4th component of positive or negative power forms an image of an object at the plane.

In such conventional zoom lenses, the 2nd component should have the strong refractive power when the large magnification varying effect can be obtained by a lesser total movement thereof. However, there is a problem that the precision accuracies of control members such as a cam for the 2nd component against the backrush, decentering and the like have to be rigorously restricted. In particular, for an advance in the compactness is achieved, an increase in the refractive power calls for a more rigorous requirement for the precision accuracy of the cam.

SUMMARY OF THE INVENTION

An object of the present invention is to provide a zoom lens having a greatly increased zoom ratio with a high relative aperture, while still permitting a minimization of the bulk and size of the lens system.

Another object of the present invention is to provide a zoom lens which is reduced in the longitudinal and lateral lengths without involving an unduly large increase in the precision accuracy of the operating mechanism.

The zoom lens according to the present invention has at least four lens components, of which the 1st counting from the object side has a positive refractive power, and the 2nd has a negative refractive power, whereby when zooming, the 2nd component is made stationary, and at least one of the aforesaid 1st component and those that follow the 2nd component is made to move axially.

That is, the refractive power of the 1st component is made positive for, as the light bundles are converged by the 1st component, the heights of incidence of the light bundles on the 2nd and following components are lowered, to thereby reduce the diameters of the 2nd through 4th components. And the 2nd component being made negative in the refractive power is given a magnification changing function, improving the magnification changing effect. Thus, a high relative aperture and compact zoom lens are realized.

BRIEF DESCRIPTION OF THE DRAWINGS

FIGS. 22-1 through 22-9, FIGS. 23-1 through 23-9, FIGS. 24-1 through 24-9, FIGS. 25-1 through 25-9, FIGS. 26-1 through 26-9, FIGS. 27-1 through 27-9, FIGS. 28-1 through 28-9, FIGS. 29-1 through 29-9, FIGS. 30-1 through 30-9 and 33-1 through 33-9 are graphic representations of the 2nd through 10th and 12th embodiments respectively.

DETAILED DESCRIPTION OF THE PREFERRED EMBODIMENTS

Figure 2:
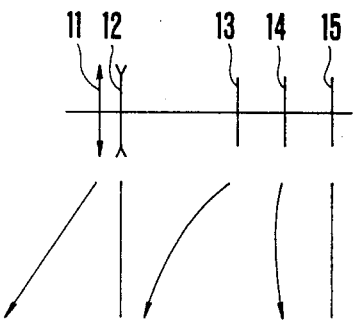
FIGS. 2, 3, 4-A, 4-B, 5 through 12 and 31 are schematic diagrams of thin lens arrangements of 1st through 12th embodiments of the present invention respectively along with their zooming paths.

Next, the construction and arrangement and the functions of the components constituting a zoom lens of the present invention will be described. FIG. 2 is a schematic diagram illustrating an arrangement of thin lens system of the 1st embodiment of a zoom lens according to the present invention. As illustrated in FIG. 2, in this embodiment, the 2nd component 12 of negative power is made to remain stationary during zooming with an advantage that the production accuracy is maintained high, and the variation of the image magnification is achieved by moving the 1st component 11 of positive power toward the front. In this case, because of holding the 2nd component stationary, it is possible to give the 2nd component a relatively strong refractive power, thereby giving another advantage of minimizing the bulk and size of the lens system.

In order to heighten the magnification varying effect of the 2nd component due to the movement of the 1st component 11, it is advantageous to use a high region of image magnification of the 2nd component. The 1st embodiment 1 is based on the finding of the fact that the construction of the 2nd component 12 in such form that the image magnification thereof takes a value of −1 (unity) at a time during zooming is advantageous at minimizing the bulk and size. This form of the 2nd component 12 that the range of variation with zooming of the image magnification of the 2nd component includes a point of unity can be achieved by satisfying the following condition:

$$el_{max} \geq f1 + 2 \times f2$$

where f1 is the focal length of the 1st component, f2 is the focal length of the 2nd component, and $el_{max}$ is the maximum value of the interval between the principal points of the 1st and 2nd components.

The shift of position of the image plane resulting from the change of the image magnification can be compensated for by moving the 3rd component 13 and/or the component that follows the 3rd component. When to increase the zoom ratio, it is desirable to move the 3rd component 13 so as to assist in increasing the zoom ratio. In the zoom lens of FIG. 2, the 3rd component 1 is made movable to larger extent, being given a magnification variation, while the image shift compensation function of maintaining the constnat position of the image plane is mainly imparted into the 4th component 14. And the fixed 5th component 15 functions to focus the light bundles on the image plane (not shown). On the other hand, it is also possible that the 1st component 11 or the 3rd component 13 also serves to compensate for the image shift due to the zooming.

Also when the 1st component and only one of those that follow the 2nd component are made to move, the paths of movement of the two zoom components must be independent of each other. In more detail, if the two components are made to move linearly to effect zooming, even though their zooming paths are different from each other, the paraxial images coincide at only three zooming positions as the image shifts with zooming. Therefore, it is impossible to achieve a high relative aperture zoom lens. For this reason, when use of the 1st component and only one of the 3rd and following components is made as the zoom components, their respective zooming paths have to be different from each other, provided that at least either one moves non-linearly, thus maintaining the constant position of the image plane.

Figures 1, 2, 3, 22:
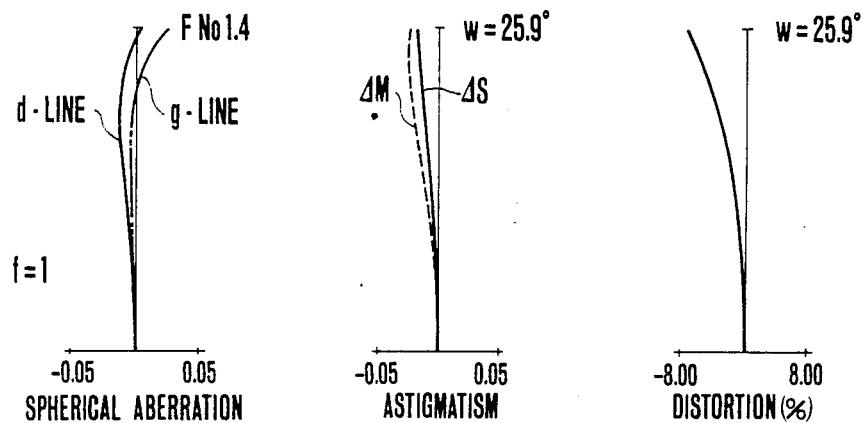

A 1st table shows the data of the 2nd embodiment of the zoom lens according to the present invention. The longitudinal section of the 2nd embodiment in the intermediate zooming position is illustrated in FIG. 13, the paraxial arrangement and the paths of zooming movement of the lens groups in a similar fashion to that in FIG. 1, and further the various aberrations in each zooming position in FIGS. 22-1 through -9.

In table 1, Ri denotes the radius of curvature of the i-th lens surface counting from the object side, Di the axial thickness or axial air separation between the i-th and (i+1)th surfaces, and Ni and $\nu i$ the refractive index and Abbe number of the glass of the i-th lens element. Further, F is the focal length of the entire system, FNo. the F-number, and $2\omega$ the image angle. All tables to be described later are shown similarly to table 1.

Figure 3:
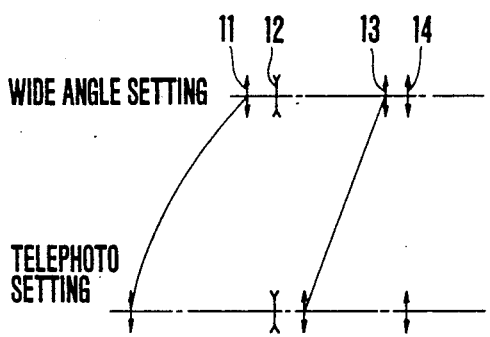
Figure 4A:
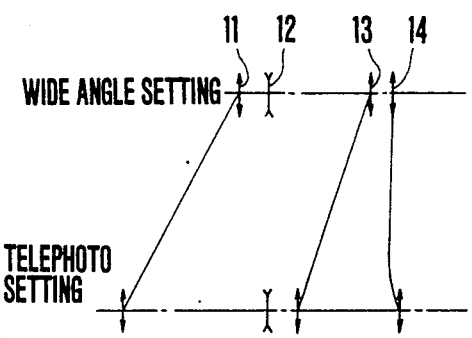
Figure 4B:
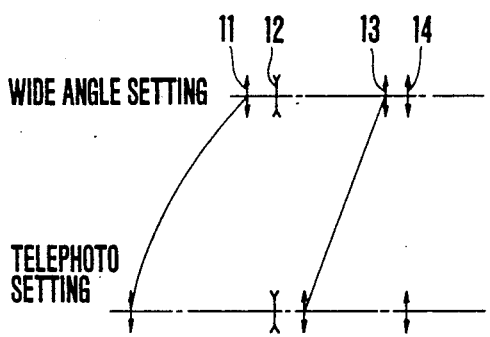
Figure 13:
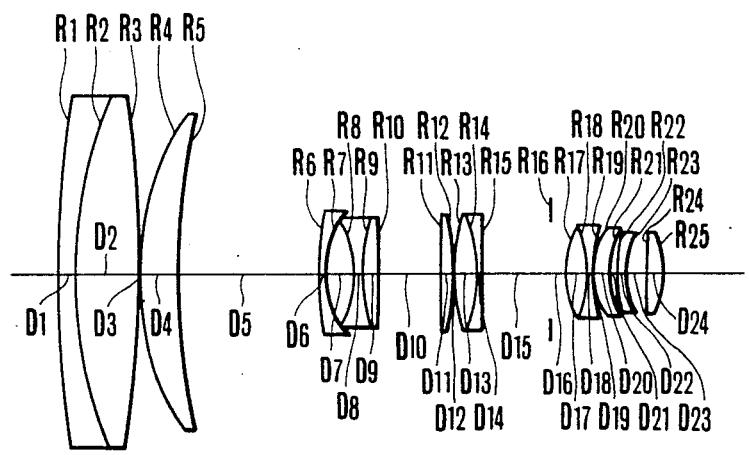
FIGS. 13 through 21 and 32 are lens block diagrams of the 2nd through 10th and 12th embodiments of the present invention respectively.

The zoom lens of 2nd embodiment is, as illustrated in FIG. 13, constructed with four lens groups of which the 1st counting from the object side (R1–R5) is positive, the 2nd (R6–R10) is negative, the 3rd (R11–R15) is positive and the 4th(R17–R25) is positive. And, as illustrated in FIG. 3, when zooming, the 1st lens group 11 and the 3rd lens group 13 are axially moved in differential relation to each other, wherein the 1st lens group 11 is made to move non-linearly toward the front as zooming is performed from the wide angle to the telephoto position, whereby the 2nd lens group 12 which remains stationary during zooming is made to have the magnification changing effect, and the 3rd lens group 13 being made to move linearly toward the front as zooming is performed from the wide angle to the telephoto position functions not only to compensate for the image shift due to the change of magnification by the 2nd lens group 12 but also to contribute to a change in the image magnification, thus achieving an efficient increase of the zooming range. Also the 4th lens group is made as the fixed lens group and by setting forth a proper focal length for the 4th lens group, the focal length of the entire system can be taken at a desired value.

A 2nd table shows the data of a 3rd embodiment of the zoom lens according to the present invention. The longitudinal section of the lens of 3rd embodiment in the intermediate focal length position is illustrated in FIG. 14, the paraxial arrangement and the paths of zooming movement of the lens groups in FIG. 4-A, an example of version of the zooming paths in FIG. 4-B, and the various aberrations in FIGS. 23-1 through -9.

Figure 14:
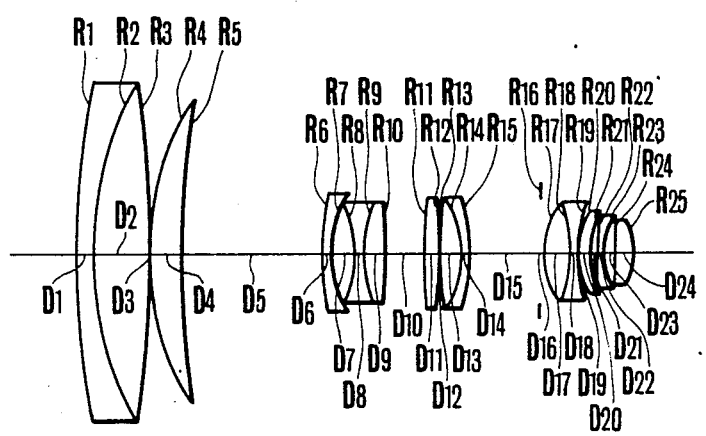
Figures 4, 5, 6, 22:
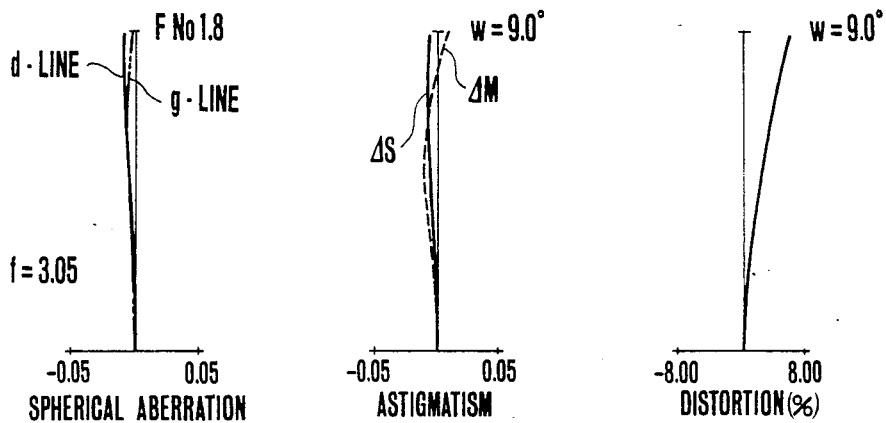
Figures 1, 2, 3, 23:
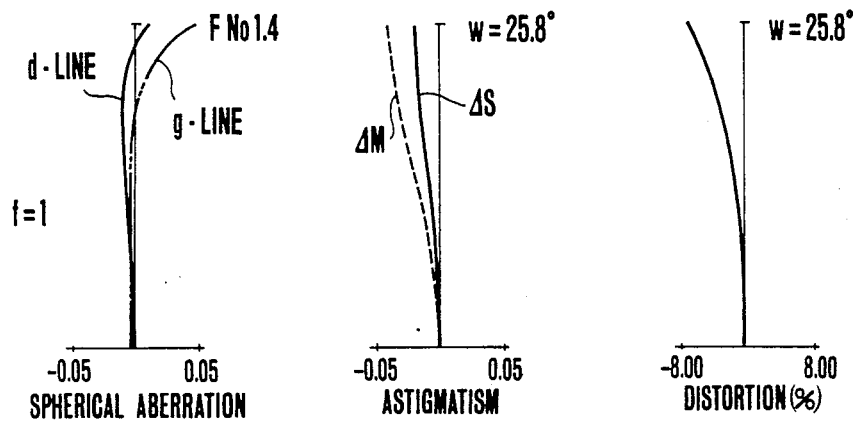
Figures 4, 5, 6, 23:
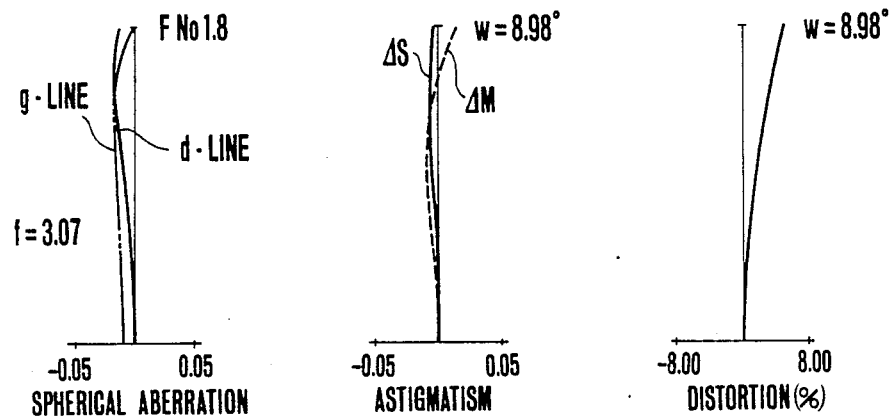
Figures 7, 8, 9, 23:
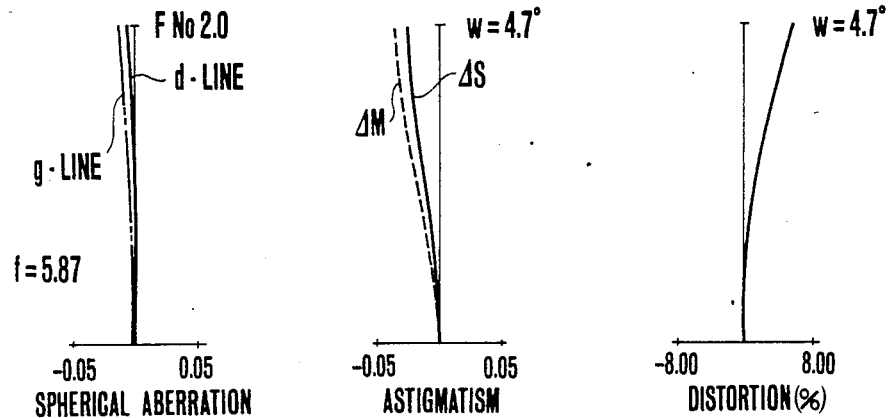

The zoom lens of 3rd embodiment is, as illustrated in FIG. 14, constructed with four lens groups, of which the positive 1st counting from front is with R1-R5, the negative 2nd is with R6-R10, the positive 3rd is with R11-R15, and the positive 4th is with R17-R25. And, as illustrated in FIGS. 4-A and 4-B, when zooming the 1st lens group 11, the 3rd lens group 13 and the 4th lens group 14, say, three lens groups, are moved in differential relation. The example in FIG. 4-A is to move the 1st lens group 11 and the 3rd lens group 13 forward both linearly but at different ratio from each other, as zooming goes on from the wide angle to the telephoto position, and to move the 4th lens group 14 simultaneously rearward non-linearly slightly to effect the image shift compensation. The 2nd example in FIG. 4-B is similar to that of FIG. 4-A in the power distribution for the wide angle and telephoto positions, but different therefrom in the paths of movement of the zoom groups such that when zooming from the wide angle to the telephoto position, the 1st lens group 11 and the 3rd lens group 13 are moved both forward, but with the 1st lens group 11 non-linearly and with the 3rd lens group 13 linearly. The 4th lens group is moved simultaneously rearward linearly. It is to be understood from this that the non-linearization of the path of movement of the 1st lens group makes it possible to linearize the path of movement of the 4th lens group 14.

Further, the zoom lens of FIG. 14 implies that without limitation to one group, two or more groups can take non-linearized paths of movement. This lead to make the power distribution in the intermediate focal length positions advantageous to correct aberrations, or to improve the smoothness of the curvature of the camming surface. Thus it is possible to obtain an uniform zooming effect.

Figures 1, 2, 3, 24:
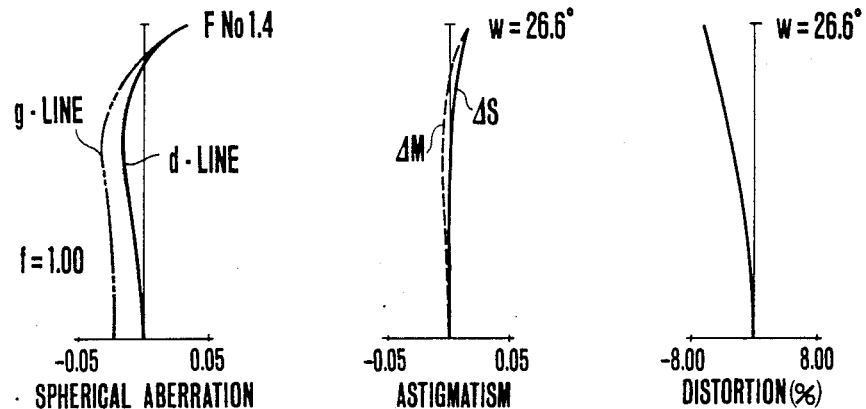
Figures 4, 5, 6, 24:
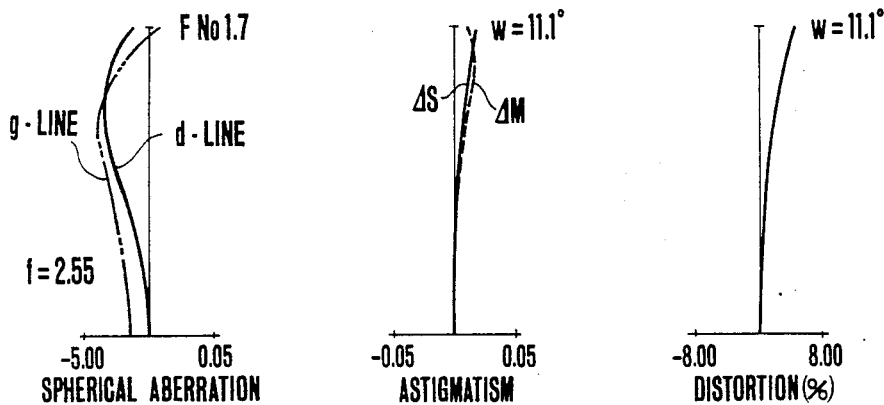
Figures 7, 8, 9, 24:
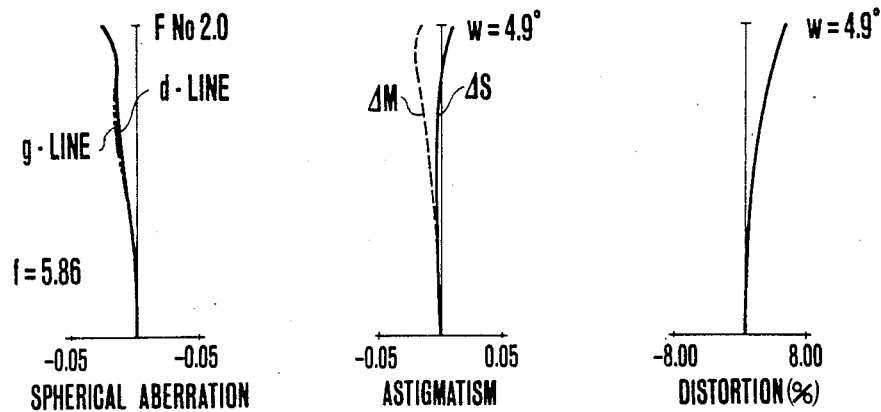

A 3rd table shows the data of a 4th embodiment of the invention. The longitudinal section of the lens of the 4th embodiment in the intermediate focal length position is illustrated in FIG. 15, the paraxial arrangement of the constituent lens groups of the same lens and the paths of movement of its zoom groups in FIG. 5, and the aberrations in each zooming position in FIGS. 24-1 through -9.

Figure 5:
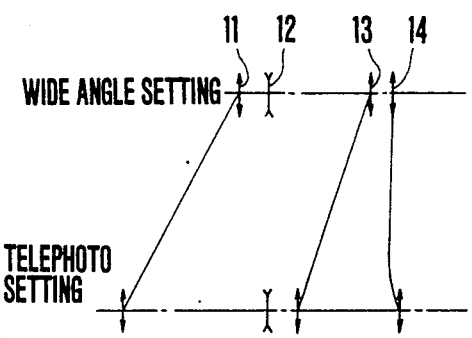
Figure 15:
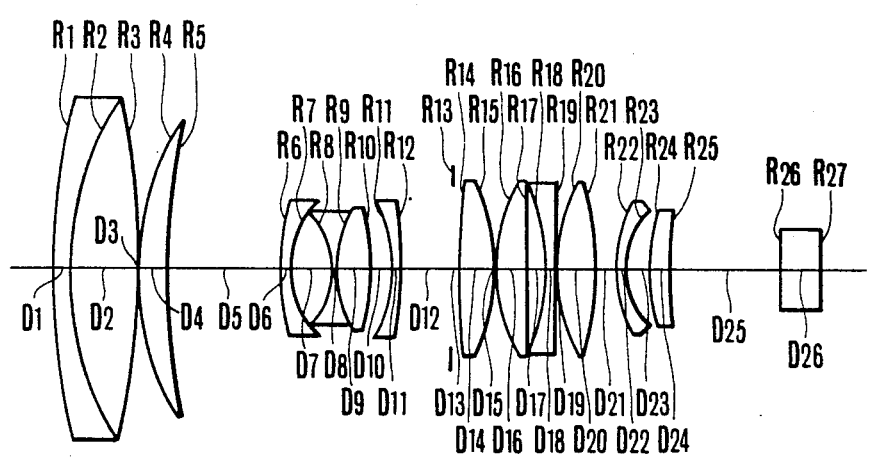

The zoom lens of 4th embodiment is, as illustrated in FIG. 15, constructed with, from front to rear, a positive 1st lens group (R1-R5), a negative 2nd lens group (R6-R10), a negative 3rd lens group (R11-R12) and a positive 4th lens group (R14-R25), wherein, as illustrated in FIG. 5, when zooming, the 1st lens group 11, the 3rd lens group 13 and the 4th lens group 14 are moved axially in differential relation to each other. The surfaces R26 and R27 define a glass plate of parallel planes. The 1st lens group 11 and the 4th lens group 14 move forward linearly but at different ratio from each other as zooming goes from the wide angle to the telephoto position, and the 3rd lens group 13 moves simultaneously but non-linearly for the image shift compensating purpose.

Figures 1, 2, 3, 25:
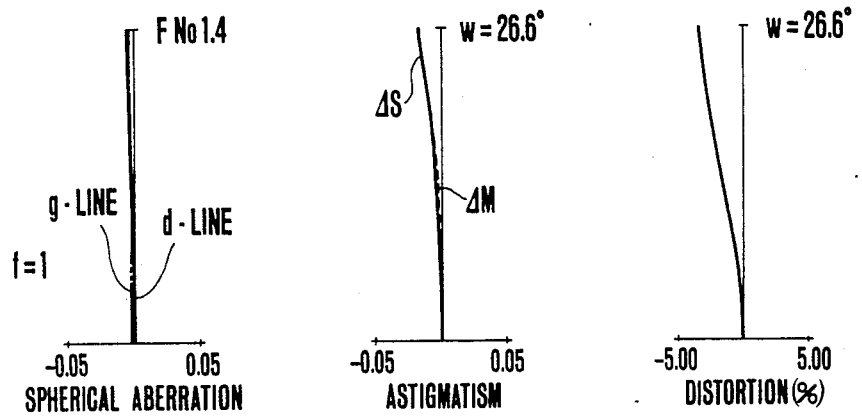
Figures 4, 5, 6, 25:
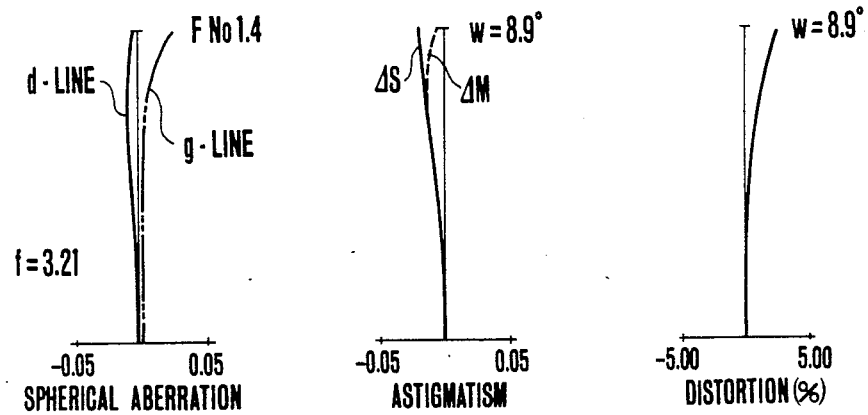
Figures 7, 8, 9, 25:
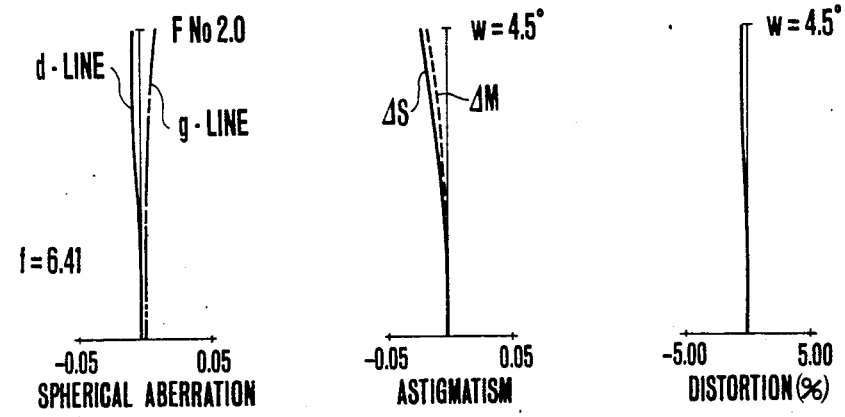

A 4th table shows the data of a 5th embodiment of the zoom lens according to the present invention. The longitudinal section of the lens of the 5th embodiment in the intermediate focal length position is illustrated in FIG. 16, the paraxial arrangement of the constituent lens groups of the same lens and the paths of movement of the zoom groups in FIG. 6, and further the aberrations in each zooming position in FIGS. 25-1 through -9.

Figure 16:
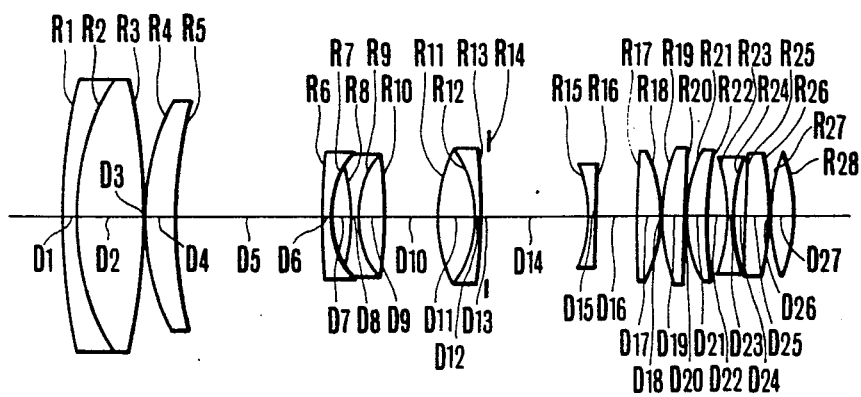

The zoom lens of the 5th embodiment is, as illustrated in FIG. 16, constructed with, from front to rear, a positive 1st lens group (R1-R5), a negative 2nd lens group (R6-R10), a positive 3rd lens group (R11-R14), a negative 4th lens group (R15-R16), and a positive 5th lens group (R17-R28), wherein when zooming, the 1st lens group, 3rd lens group and 4th lens groups are moved axially in differential relation to each other. As shown in FIG. 6, when zooming from the wide angle to the telephoto position, the 1st lens group 11 and the 3rd lens group 13 move forward non-linearly, the 4th lens group 14 moves rearward linearly. In this connection it should be explained that the forward movement of the 1st lens group 11 results in a change of the image magnification even though the 2nd lens group 12 remains stationary, and the rearward movement of the 4th lens group 14 changes the image magnification, while the movement of the 3rd lens group 13 compensates for the image shift. The 5th lens group 15 remains stationary during zooming, focusing the light bundles from the 4th lens group 14 onto the image plane. And the refractive power of this or 5th lens group is so chosen as to take the focal length of the entire system at a desired value.

In the 1st to 5th embodiments described above, by making use of the form that has four lens groups, from front to rear, the 1st lens group being of positive refractive power, the 2nd lens group of negative refractive power, and the 3rd and 4th lens groups of positive or negative refractive power, a zoom lens having a high relative aperture with the zoom ratio taking as high a value as about 6, while still preserving the high precision accuracy when manufacturing the operating mechanisms econimically, and also permitting the bulk and size to be minimized, is obtained.

Figures 7, 8, 9, 22:
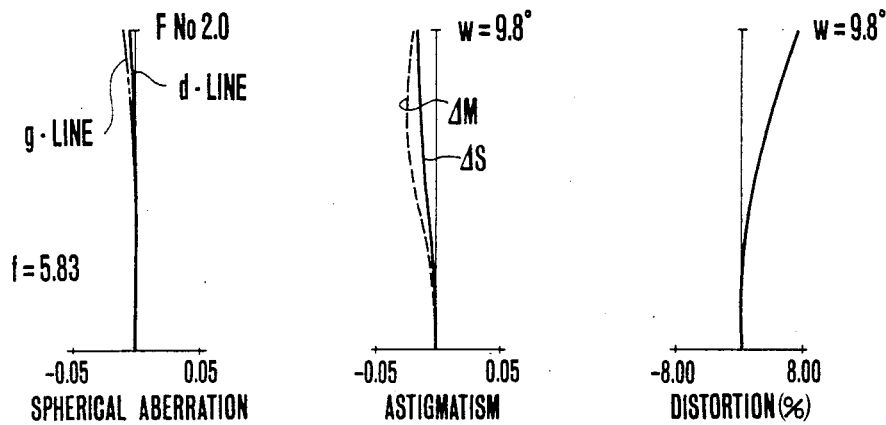

FIG. 7 is a 6th embodiment of the present invention. In the 6th embodiment, the 3rd lens group is made to be of negative refractive power, and the 4th lens group to be of positive or negative refractive power, at least four lens groups being used as the constituent groups, whereby when zooming, the 1st lens group of positive refractive power and the 3rd lens group are made to move, and the 2nd lens group of strong negative refractive power and the 4th lens group are made fixed. And by moving the aforesaid 1st lens group, the magnification changing effect is laid on the 2nd lens group.

In the zoom lens according to the 6th embodiment, it is desirable that the 2nd lens group has a large magnification changing effect, and, in order to construct it in a compact form despite the large zoom ratio, the image magnification of the 2nd lens group varies with zooming in a range including unity ($-1$).

A 5th table shows the paraxial arrangement of the zoom lens according to the 6th embodiment, and, in FIG. 7, there is illustrated the path of movement of the zoom lens given in table 5.

In table 5 and those that follow, fi is the focal length of the i-th lens group, ei the interval between the principal points of the i-th lens group and the (i+1)th lens group, and $\beta i$ is the image magnification of the i-th lens group. The zoom lens of the 6th embodiment shown in table 5 comprises, from front to rear, a positive 1st lens group 11, a negative 2nd lens group 12, a negative 3rd lens group 13 and a positive 4th lens group 14. As illustrated in FIG. 7, the 1st lens group 11 and the 3rd lens group 13 are moved in respective different paths from each other to effect zooming. That is, as zooming goes from the wide angle to the telephoto position, the 1st lens group 11 moves forward linearly so that the 2nd lens group performs the duty of changing the image magnification, while the 3rd lens group moves rearward non-linearly to perform the duty of compensating the image shift.

Figure 17:
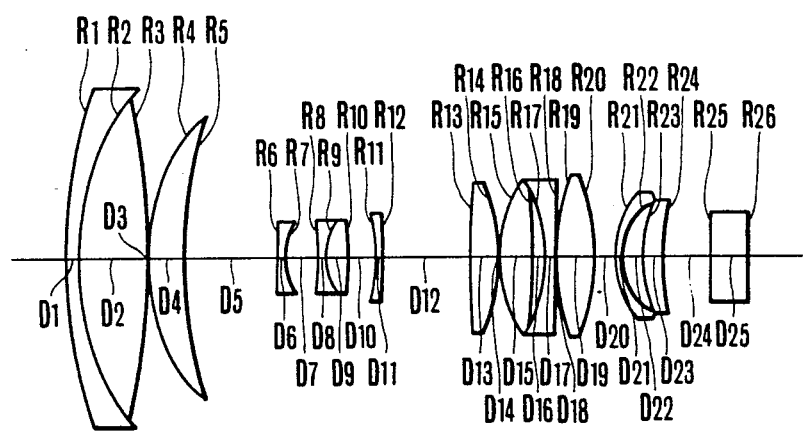
Figures 1, 2, 3, 26:
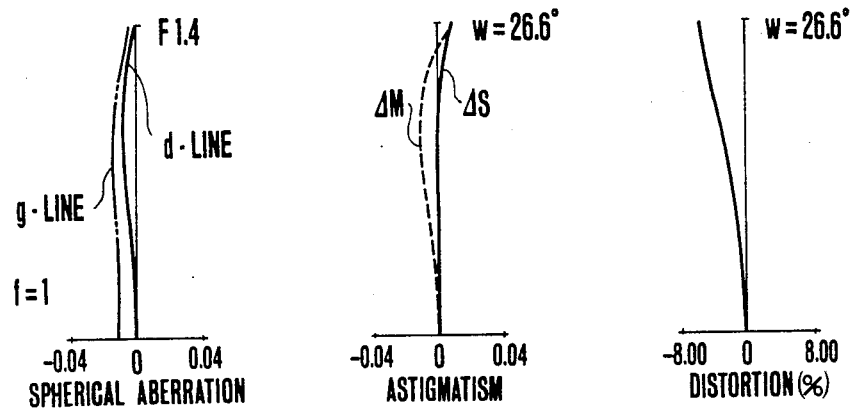
Figures 4, 5, 6, 26:
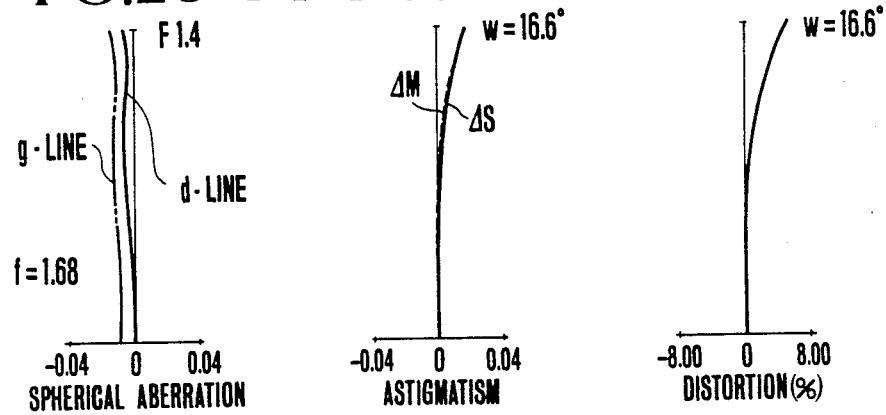
Figures 7, 8, 9, 26:
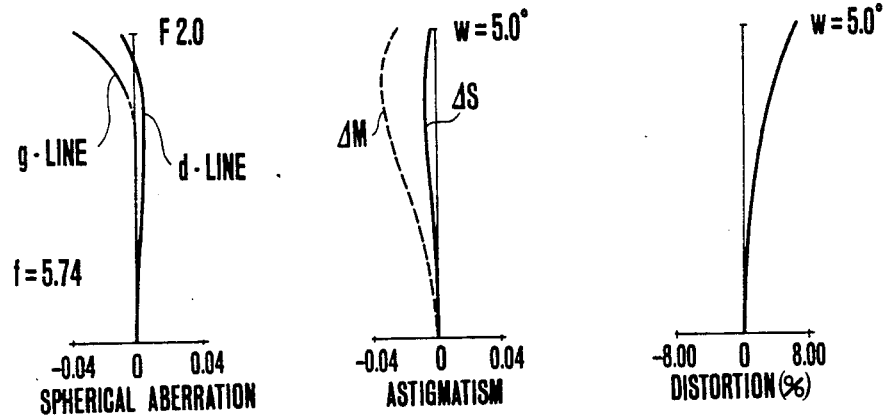

In the 6th embodiment, the 3rd lens group 13 is given a negative refractive power, thereby the range of existence of refractive powers as the actual solution for the image shift compensation is widened, and therefore it is made possible to set forth a weak refractive power. Therefore, the form of the 3rd lens group can be simplified, and the total movement of the 3rd lens group for the image shift compensation can be reduced. The 4th lens group 14 performs image formation of the entire lens system. Since, in this case, a function allotment is possible such that the magnification changing is effected by the 1st to 3rd lens groups, and the image forming is effected by the 4th lens group, there is a merit that the variation of aberrations with zooming can be corrected by the 1st lens group to the 3rd lens group, and the component of the aberrations which does not concern with zooming can be corrected by the 4th lens group. The 6th table is the lens data illustrating an example of a thick lens system as derived from the paraxial arrangement of the 6th embodiment shown in the 5th table. The longitudinal section of the zoom lens shown in table 6 in the intermediate focal length position is illustrated in FIG. 17, and the various aberrations in each zooming position in FIGS. 26-1 through -9.

A 7th table shows the paraxial arrangement of a 7th embodiment of the zoom lens according to the present invention, and, in FIG. 8, there is shown the path of movement of the zoom lens shown in this or 7th table.

The zoom lens shown in table 7 comprises, from front to rear, a positive 1st lens group 11, a negative 2nd lens group 12, a negative 3rd lens group 13, a negative 4th lens group 14 and a positive 5th lens group 15, wherein when zooming, as illustrated in FIG. 8, the 1st lens group 11, the 3rd lens group 13 and the 5th lens group 15 are moved. As zooming goes from the wide angle to the telephoto position, the aforesaid 1st lens group and 5th lens group move forward linearly to perform the duty of changing the magnification, while the 3rd lens group moves non-linearly to perform the duty of compensating the image shift. The effects and results of the 1st lens group 11, the 2nd lens group 12 and the 3rd lens group are similar to those in the 6th embodiment. Further as the 4th lens group 14 use is made of the stationary group of negative refractive power so that the magnification changing power by the 5th lens group is increased. As a result, the magnification changing power can be properly born on the 2nd lens group and the 5th lens group, thus having obtained a zoom lens which is easy to manufacture.

Figure 18:
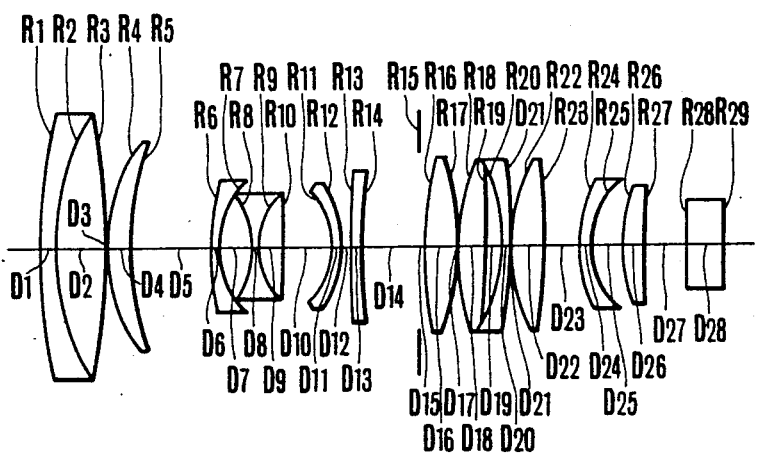
Figures 1, 27:
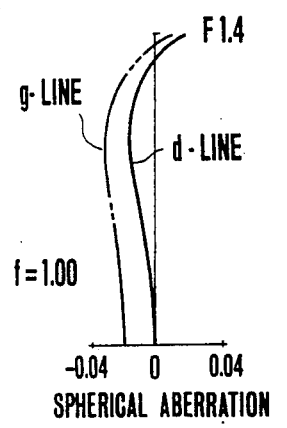
Figures 2, 27:
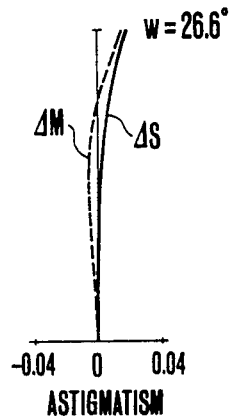
Figures 3, 27:
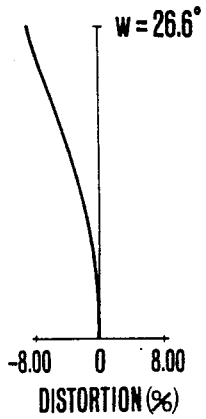
Figures 4, 27:
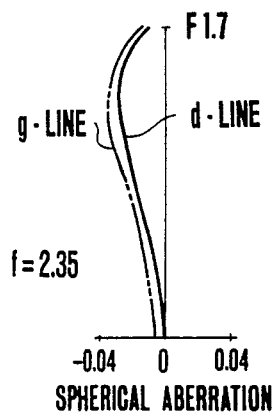
Figures 5, 27:
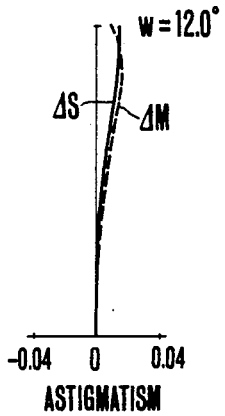
Figures 6, 27:
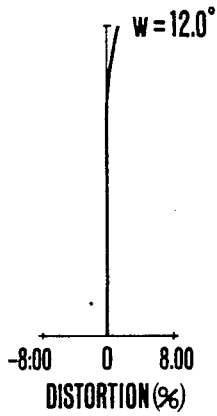
Figures 7, 27:
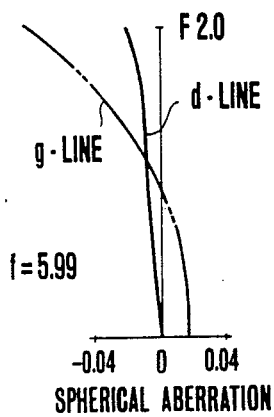
Figures 8, 27:
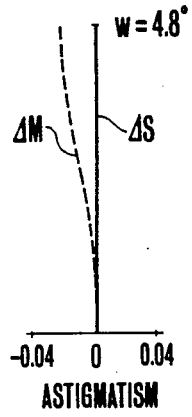
Figures 9, 27:
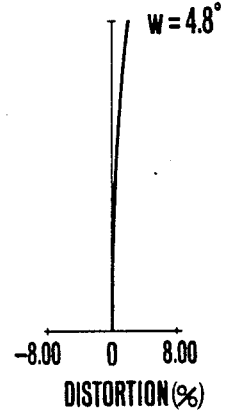

An 8th table is the lens data illustrating an example of a thick lens system as derived from the paraxial arrangement of the 7th embodiment shown in table 7. The longitudinal section of the zoom lens shown in table 8 in the intermediate focal length position is illustrated in FIG. 18 and the various aberrations in each zooming position in FIGS. 27-1 through -9.

In the zoom lenses according to the 6th and 7th embodiments, from front to rear, three lens groups of positive, negative and negative powers are followed by at least one lens groups, wherein by holding the negative 2nd lens group and the 4th lens group stationary during zooming, a compact zoom lens of high zoom ratio and good production accuracy can be realized.

FIG. 9 is an 8th embodiment of the present invention comprising, from front to rear, a 1st lens group of positive refractive power, a 2nd lens group of negative refractive power, a 3rd lens group of positive refractive power and a 4th lens group of positive or negative refractive power wherein when zooming, all the lens groups except the 2nd lens group are moved to effect zooming, and in particular, the 1st lens group and the 3rd lens group are moved as a unit. And, the 2nd lens group of strong refractive power is held stationary during zooming, but the movement of the 1st lens group allows the 2nd lens group to produce the magnification changing effect. By fixing the 2nd lens group, a cam or other movement control element is not necessarily employed so that even when a strong power is given to the 2nd lens group, the production accuracy can be maintained at a high level.

Also by moving the 1st lens group and the 3rd lens group as a unit, the operating mechanism is prevented from being increased in the complexity of structure, while still permitting the 2nd lens group and the 3rd lens group to accomplish the duty of changing the image magnification with the limitation of the bulk and size to a minimum.

It is to be noted that the 8th embodiment has been described in connection with the 4th lens group of positive refractive power.

In the zoom lens of the 8th embodiment, as compared with the wide angle position, when in the telephoto position, the 1st lens group 11 and the 3rd lens group 13 are positioned on the object side, and the 4th lens group on the image side.

To achieve a zoom lens of large relative aperture, it is necessary to arrange a positive refractive power in the 1st lens group 11. That is by converging the light bundles in passing through the 1st lens group, the heights of incidence of the light bundles on the 2nd and following lens groups can be lowered to thereby facilitate the aberration correction despite the large relative aperture.

In order that the 2nd lens group 12 has the image changing power, it is necessary to give it a strong negative power. The use of this powerful 2nd lens group as the movable lens is advantageous to the change of magnification, but the production accuracy on the operating mechanism becomes severer. In the present invention, as a means of solving this problem, the 2nd lens group 12 is made fixed, and the movement of the 1st lens group allows for the 2nd lens group to accomplish the duty of changing the magnification.

Further, the 3rd lens group 13 is made to move in unison with the 1st lens group so that even the 3rd lens group 13 is made to bear part of the duty of changing the magnification, thus achieving an efficient change of the magnification. Such change of the image magnification by the 2nd and 3rd lens groups 12 and 13 results in a shift of the image plane which is then compensated for by moving the 4th lens group 14 non-linearly. It is to be noted that in the 8th embodiment the image magnification of this or 4th lens group 14 becomes larger when in the telephoto of this or 4th lens group 14 becomes larger when in the telephoto positions than when in the wide angle positions. The unified movement of the 1st and 3rd lens groups 11 and 13 has another advantage that the structure of the operating mechanism can be simplified, and a zoom lens of high zoom ration operating with high accuracy can be realized.

Figure 1:
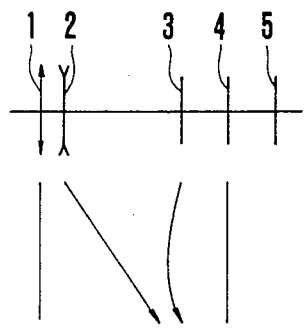
FIG. 1 is a schematic diagram illustrating a thin lens arrangement of the conventional zoom lens and the paths of movement of the zoom components.
Figure 19:
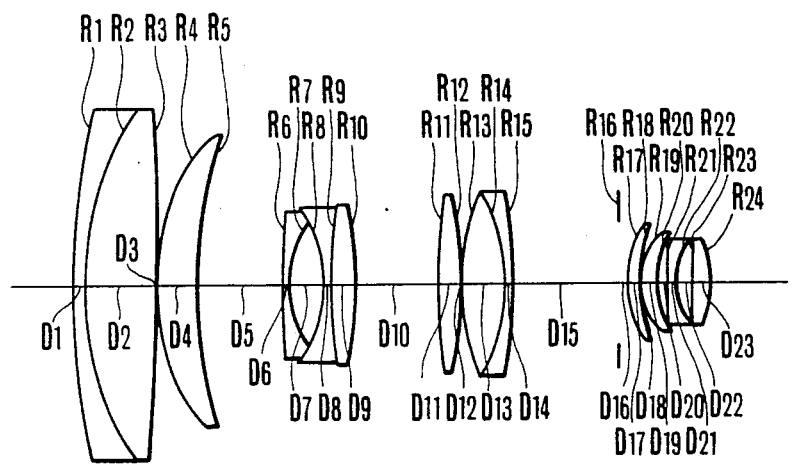
Figures 1, 2, 3, 28:
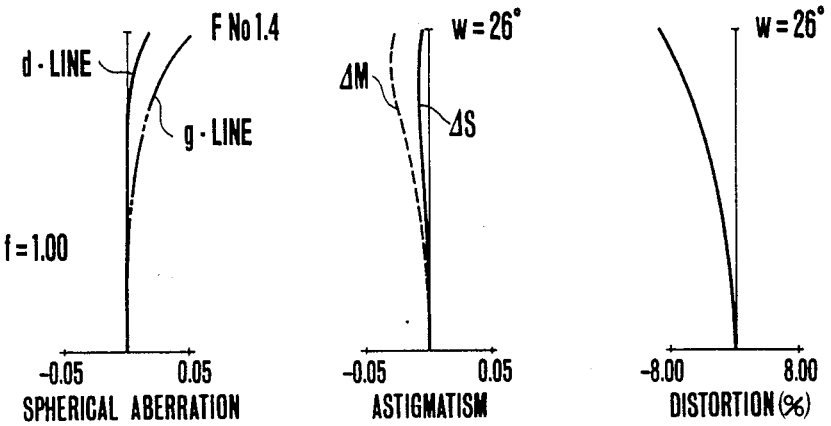
Figures 4, 5, 6, 28:
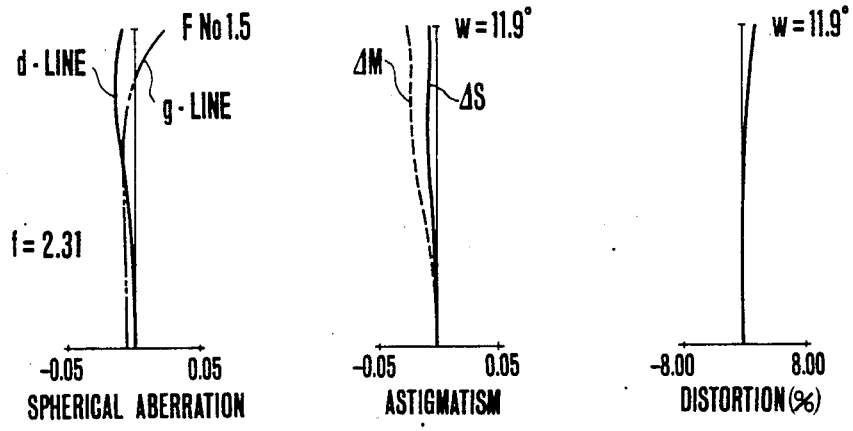
Figures 7, 8, 9, 28:
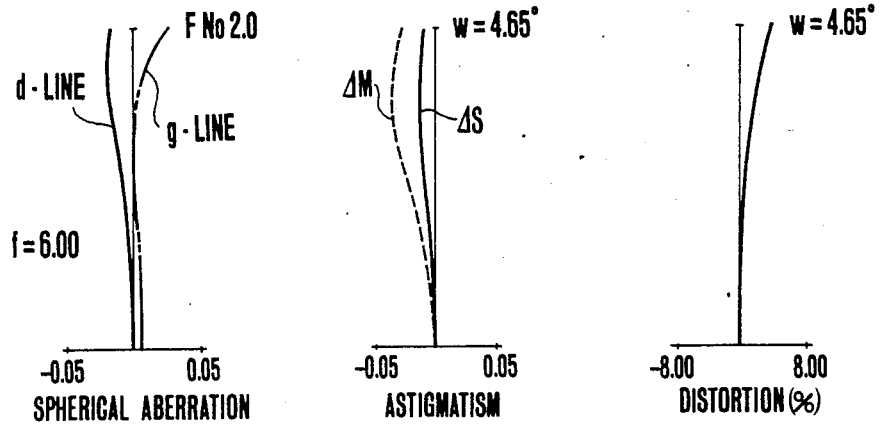

The data of a practical example of a thick lens system as derived from the zoom lens shown in FIG. 9 are shown in a 9th table, the longitudinal section of that system in the intermediate focal length position in FIG. 19, and the various aberrations in each zooming position in FIGS. 28-1 through -9.

Figure 10:
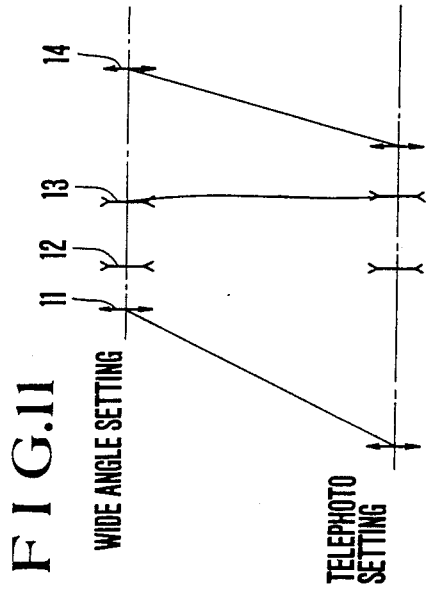

FIG. 10 is a diagram illustrating the paraxial arrangement and the zooming paths of a 9th embodiment of the zoom lens according to the present invention. The zoom lens comprises, from front to rear, a positive 1st lens group 11, a negative 2nd lens group 12, a positive 3rd lens group 13 and a positive 4th lens group 14 arranged on a common optical axis, wherein when zooming, the 1st and 3rd lens groups are moved as a unit, and the 4th lens group is moved in a different path therefrom. The 2nd lens group 12 remains stationary during zooming. As compared with the wide angle position, when in the telephoto position, the 1st, 3rd and 4th lens groups take their places on the object side. In the 9th embodiment shown in FIG. 10, the 1st and 3rd lens groups move linearly, while the 4th lens group moves, depicting a trace convex toward the rear. The movement of the 1st and 3rd lens groups allows for the 2nd and 3rd lens groups to produce the magnification changing effect, and the movement of the 4th lens group effects the image shift compensation.

Figure 20:
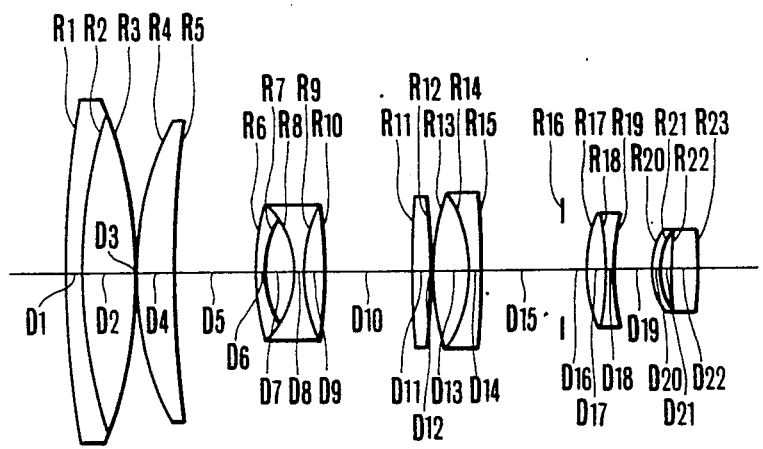
Figures 1, 2, 3, 29:
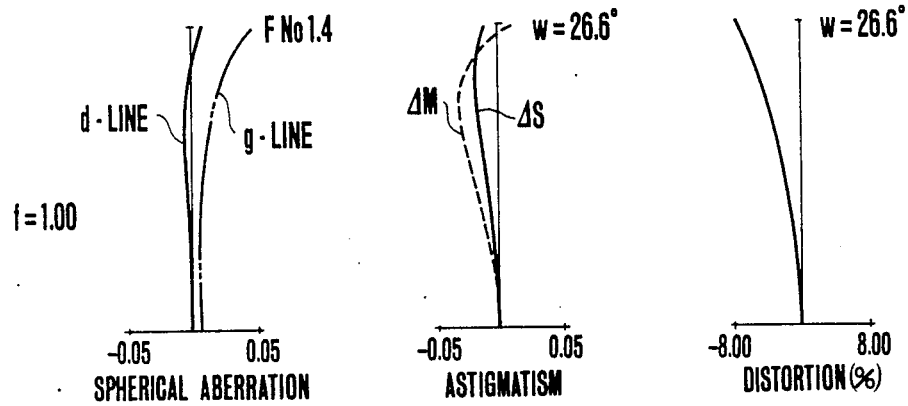
Figures 4, 5, 6, 29:
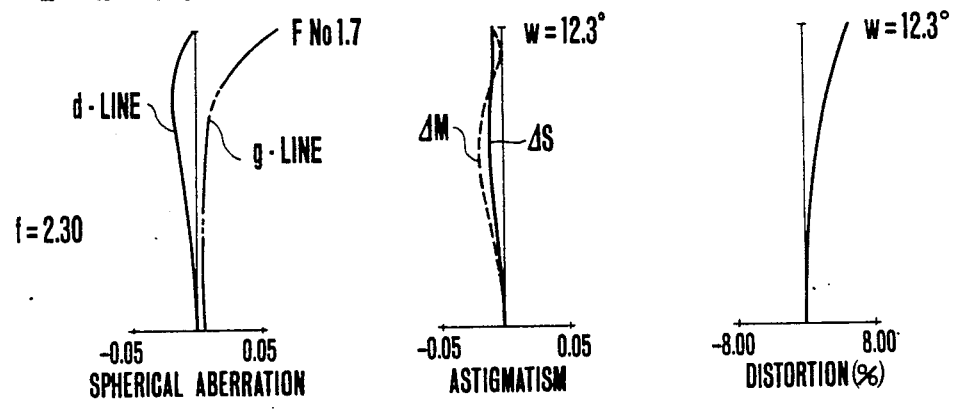
Figures 7, 8, 9, 29:
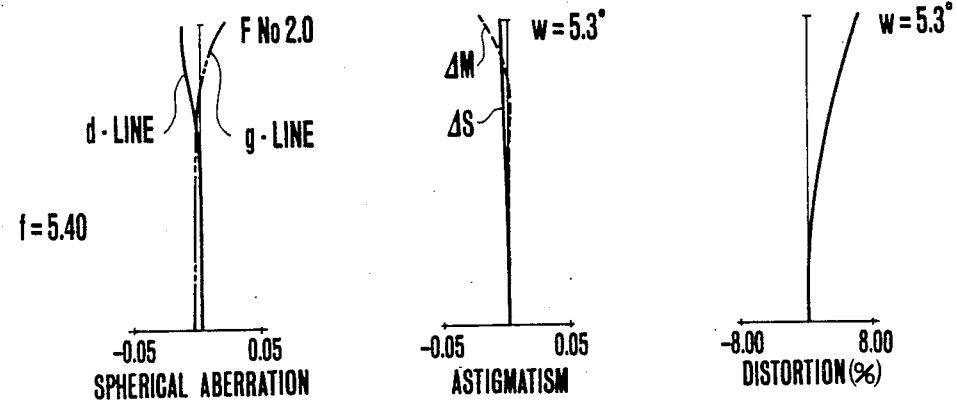

A practical example of the data of a thick lens system as derived from the zoom lens shown in FIG. 10 is shown in a 10th table, the longitudinal section of that system in the intermediate focal length position of table 10 in FIG. 20, and the various aberrations in each zooming position in FIGS. 29-1 through -9.

In the 8th and 9th embodiments described above, the zoom lens has four lens groups with the three lens groups of positive, negative and positive refractive power in this order from front, and at least one lens group, wherein when zooming, the 1st lens group and the 3rd lens group are moved as a unit, the 2nd lens group is held stationary , and the 4th lens group is moved to effect the image shift compensation, whereby a zoom lens of compact form with good production accuracy is realized. Further, the image changing power is so properly distributed on the 2nd and 3rd lens groups that a zoom lens of high relative aperture while still permitting good correction of aberrations is realized.

Figure 11:
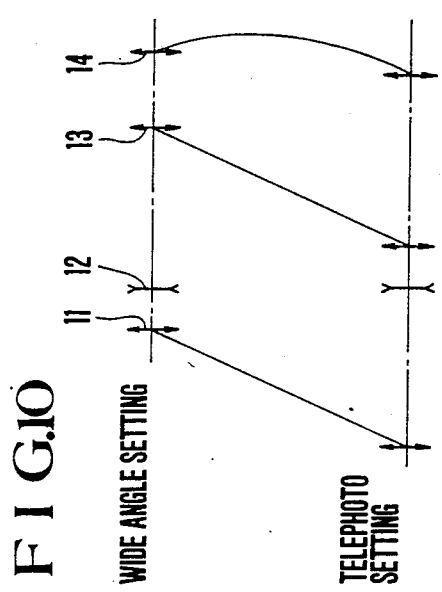

FIG. 11 is a 10th embodiment of the present invention. The zoom lens according to the 10th embodiment comprises, from front to rear, a positive 1st lens group, a negative 2nd lens group, a negative 3rd lens group and a positive or negative 4th lens group, wherein when zooming, the aforesaid 1st lens group 3rd lens group and 4th lens group are moved, and the 2nd lens group of strong refractive power is held stationary. And, the movement of the 1st lens group allows for the 2nd lens group to produce the magnification changing effect.

In the zoom lens according to the 10th embodiment, it is desirable that the 2nd lens group is made to bear a large image magnification changing effect, and in order to minimize the bulk and size despite the large zoom ratio, the image magnification of the 2nd lens group varies with zooming in a range including unity $(-1)$.

An 11th table shows the paraxial arrangement of the 10th embodiment, and FIG. 11 illustrates the path of movement of the zoom lens shown in this or 11th table.

The zoom lens according to the 10th embodiment is that as illustrated in FIG. 11, as zooming goes from the wide angle to the telephoto position, the 1st lens group 11 and the 4th lens group 14 move forward, and the 3rd lens group 13 moves non-linearly. And, the 1st lens group and the 4th lens group moves for the magnification changing purpose, and the 3rd lens group moves for the image shift compensating purpose. It is noted that the 2nd lens group 12 is held stationary during zooming.

In the 10th embodiment, the refractive power of the 3rd lens group 13 is made negative, thereby the range of existence of refractive powers giving the actual solution for the image shift compensation is widened, and a weak refractive power can be set forth. Therefore, the structure of the 3rd lens group can be simplified and the total movement for the image shift compensation can be reduced.

The 4th lens group 14 not only performs the image forming function of the entire lens system, but also changes the image magnification as it moves forward when zooming. By making the 4th lens group to partake of the image magnification changing function, a portion of the image magnification changing power may be laid on the 2nd lens group 12 with an advantage that the variation of the aberrations and the amount of aberrations produced of each lens group can be suppressed to a minimum. It is desirable that each movable lens group moves in the respective individual different zooming path so as not to reduce the degree of freedom of the refractive power arrangement suited for the aberration correction.

Figure 21:
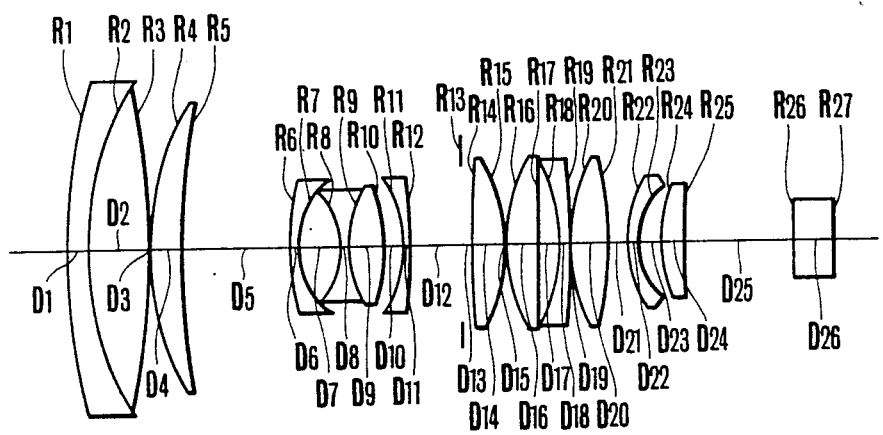
Figures 1, 2, 3, 30:
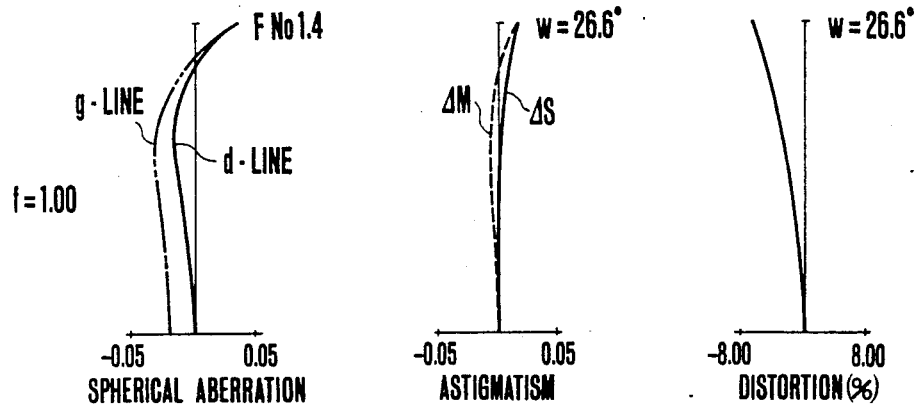
Figures 4, 5, 6, 30:
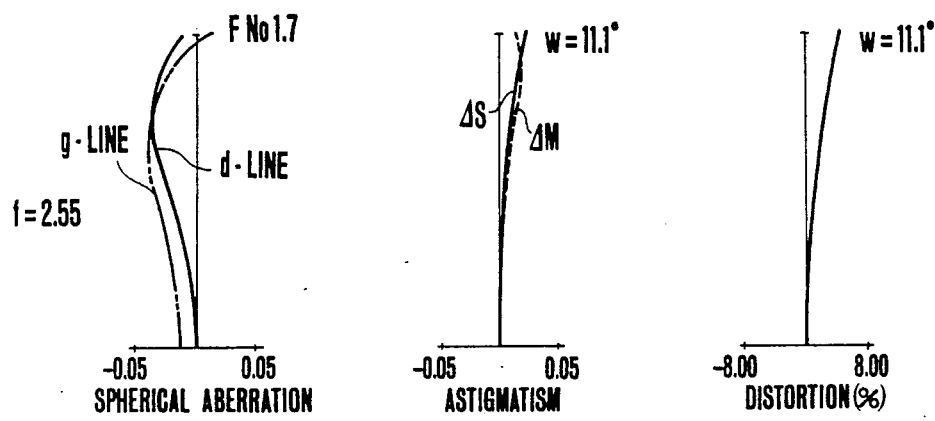
Figures 7, 8, 9, 30:
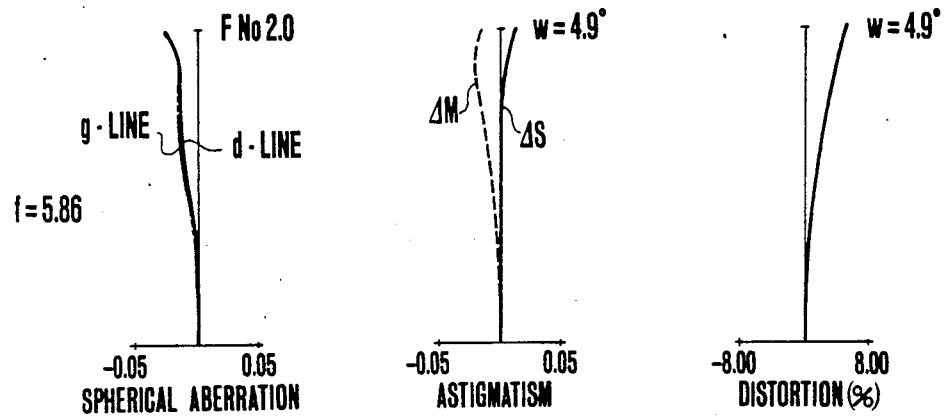

Next, a practical example of the data of a thick lens system as derived from the paraxial arrangement shown in table 11 is given in a 12th table. The longitudinal section of the zoom lens of the 10th embodiment shown in table 12 in the intermediate focal length position is illustrated in FIG. 21, and the various aberrations in each zooming position in FIGS. 30-1 through -9.

Figure 12:
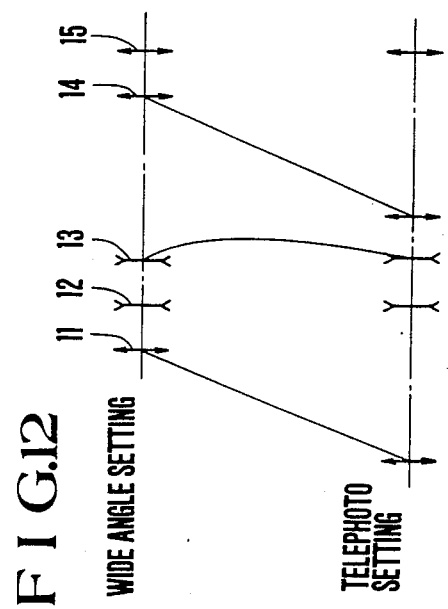

A 13th table shows the paraxial arrangement of an 11th embodiment of the zoom lens according to the present invention, and FIG. 12 is a diagram illustrating the path of movement of the zoom lens shown in this or 13th table.

The zoom lens according to the 11th embodiment has, from front to rear, a positive 1st lens group 11, a negative 2nd lens group 12, a negative 3rd lens group 13, a 4th lens group of positive refractive power and a 5th lens group of positive refractive power, wherein as illustrated in FIG. 12, when zooming, the 1st lens group 11, the 3rd lens group 13 and the 4th lens group 14 are moved, and the 2nd lens group 12 and the 5th lens group 15 are held stationary. As zooming goes from the wide angle to the telephoto position, the 1st lens group 11 and the 4th lens group 14 both moves forward linearly having the magnification changing effect, and the 3rd lens group 13 moves in a non-linear path convex toward the rear to accomplish the duty of compensating for the image shift. The effect of the stationary 2nd lens group 12 on the image magnification change is similar to that described in connection with the 10th embodiment, and the 5th lens group 15 is made to bear part of the image forming function, thereby the degree of freedom of the image magnification by the 4th lens group 14 is increased, thus a zoom lens of increased range while still permitting the minimization of the bulk and size can be realized.

As has been described in greater detail above, in the 10th and 11th embodiments, the zoom lens having four lens groups of positive, negative, negative and positive refractive powers in this order from front with the negative 2nd lens group when held stationary is possible to realize a compact zoom lens of high range with good production accuracy.

Figure 31:
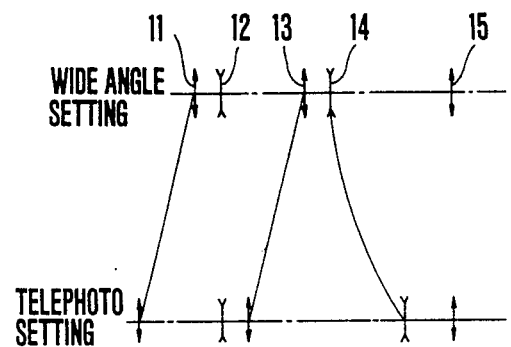

FIG. 31 illustrates 12th embodiment of the present invention. In the 12th embodiment, the zoom lens has five lens groups, or, from front to rear, a positive 1st lens group, a negative 2nd lens group, a positive 3rd lens group, a negative 4th lens group and a positive 5th lens group, wherein when zooming, the 2nd lens group and the 5th lens group are made to remain stationary, and the 1st lens group, the 3rd lens group and the 4th lens group are made to move.

The embodiment of FIG. 31 is in that the 1st lens group 11 and the 3rd lens group move as a unit. When zoomed in the telephoto positions, the 1st lens group 11 and the 3rd lens group 13 lie on the object side and the 4th lens group on the image side as compared with the wide angle positions. In the zoom lens according to the FIG. 32 embodiment, the magnification variation is born not only on the two negative lens groups, namely, the 2nd lens group 12 and the 4th lens group, but also on the positive 3rd lens group so that the change of image magnification is effectively performed, as the 2nd through 4th lens groups all contribute to an increase in the image magnification. Further, by moving the 1st lens group 11 and the 3rd lens group as a unit, despite the use of three zoom lens groups, the operating mechanism is prevented from becoming complicated in structure, when a high range zoom lens is realized. Also by moving the 4th lens group 14, the image shift resulting from the change of image magnification is compensated for.

The focal length fi of each lens group and the interval e'i between the principal points of the successive two lens groups of the paraxial arrangement shown in FIG. 31 are given in a 14th table.

Figure 32:
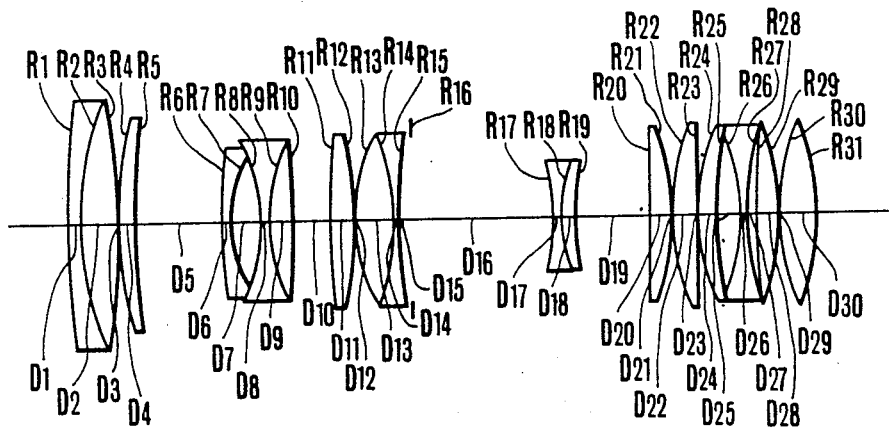
Figures 1, 2, 3, 33:
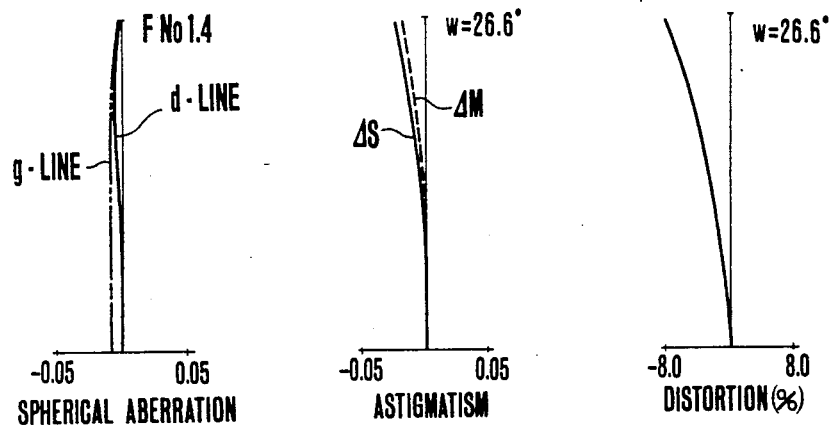
Figures 4, 5, 6, 33:
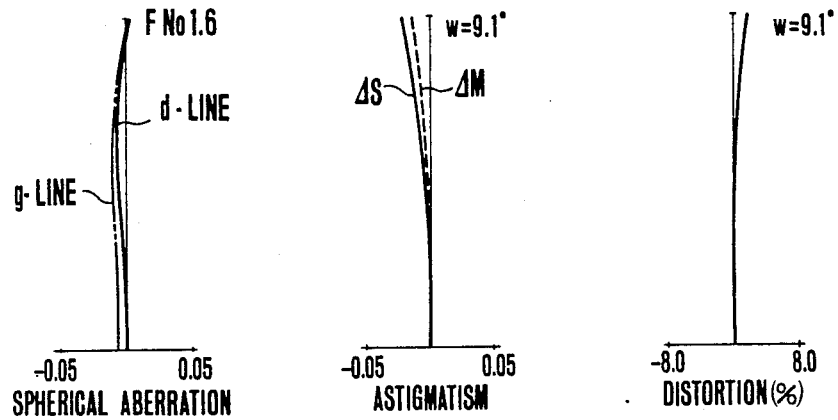
Figures 7, 8, 9, 33:
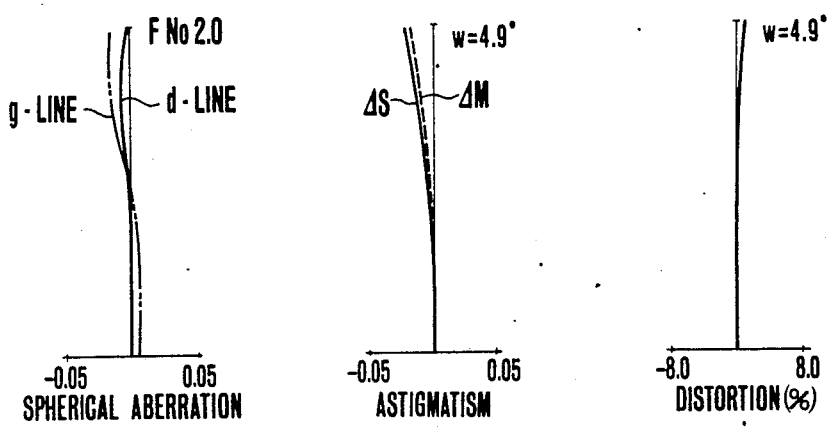

An example of lens data of a thick system as derived from the paraxial arrangement shown in Table 14 is given in a 15th table, a longitudinal section of that lens in an intermediate focal length position in FIG. 32, and its aberrations in FIGS. 33-1 through -9.

As in the above, the 12th embodiment has achieved a zoom lens of high range while permitting good correction of aberrations by making five lens groups to constitute that zoom lens and by making the 1st, 3rd and 4th lens groups to move with the 1st and 3rd lens groups being moved integratedly.

TABLE 1

| F = 1.00–5.83 | FNo. = 1:1.4–2.0 | 2ω = 51.8°–9.52° | |
|---|---|---|---|
| R1 = 17.978 | D1 = 0.19 | N1 = 1.80518 | ν1 = 25.4 |
| R2 = 5.540 | D2 = 0.97 | N2 = 1.51633 | ν2 = 64.1 |
| R3 = −12.950 | D3 = 0.01 | | |
| R4 = 3.779 | D4 = 0.62 | N3 = 1.69680 | ν3 = 55.5 |
| R5 = 14.160 | D5 = Variable | | |
| R6 = 4.580 | D6 = 0.10 | N4 = 1.77250 | ν4 = 49.6 |
| R7 = 1.374 | D7 = 0.44 | | |
| R8 = −1.603 | D8 = 0.10 | N5 = 1.77250 | ν5 = 49.6 |
| R9 = 2.315 | D9 = 0.26 | N6 = 1.84666 | ν6 = 23.9 |
| R10 = −10.311 | D10 = Variable | | |
| R11 = 52.757 | D11 = 0.18 | N7 = 1.77250 | ν7 = 49.6 |
| R12 = −3.285 | D12 = 0.01 | | |

TABLE 1-continued

| R13 = 3.492 | D13 = 0.35 | N8 = 1.80610 | ν8 = 40.9 |
|---|---|---|---|
| R14 = −2.406 | D14 = 0.06 | N9 = 1.84666 | ν9 = 23.9 |
| R15 = 105.844 | D15 = Variable | | |
| R16 = 0.0 (Stop) | D16 = 0.09 | | |
| R17 = 1.748 | D17 = 0.31 | N10 = 1.65160 | ν10 = 58.6 |
| R18 = −1.414 | D18 = 0.09 | N11 = 1.80610 | ν11 = 40.9 |
| R19 = 2.885 | D19 = 0.01 | | |
| R20 = 1.073 | D20 = 0.22 | N12 = 1.69680 | ν12 = 55.5 |
| R21 = 1.192 | D21 = 0.13 | | |
| R22 = 1.956 | D22 = 0.09 | N13 = 1.84666 | ν13 = 23.9 |
| R23 = 0.969 | D23 = 0.31 | | |
| R24 = 4.794 | D24 = 0.26 | N14 = 1.83400 | ν14 = 37.2 |
| R25 = −1.737 | | | |

| Focal Length | Variable Separation | | | Image Magnification | | |
|---|---|---|---|---|---|---|
| | D5 | D10 | D15 | 2nd Group | 3rd Group | 4th Group |
| 1.00 | 0.054 | 1.999 | 0.126 | −0.329 | −1.090 | 0.477 |
| 3.05 | 2.055 | 0.925 | 1.200 | −0.693 | −1.586 | 0.477 |
| 5.83 | 2.715 | 0.184 | 1.941 | −1.090 | −1.925 | 0.477 |

TABLE 2

| F = 1.00–5.87 | FNo. = 1:1.4–2.0 | 2ω = 51.8°–9.44° | |
|---|---|---|---|
| R1 = 12.491 | D1 = 0.18 | N1 = 1.80518 | ν1 = 25.4 |
| R2 = 4.130 | D2 = 0.97 | N2 = 1.51633 | ν2 = 64.1 |
| R3 = −21.455 | D3 = 0.01 | | |
| R4 = 3.771 | D4 = 0.62 | N3 = 1.69680 | ν3 = 55.5 |
| R5 = 20.465 | D5 = Variable | | |
| R6 = 3.542 | D6 = 0.10 | N4 = 1.77250 | ν4 = 49.6 |
| R7 = 1.357 | D7 = 0.39 | | |
| R8 = −1.566 | D8 = 0.10 | N5 = 1.77250 | ν5 = 49.6 |
| R9 = 1.720 | D9 = 0.31 | N6 = 1.84666 | ν6 = 23.9 |
| R10 = −26.845 | D10 = Variable | | |
| R11 = 11.271 | D11 = 0.22 | N7 = 1.77250 | ν7 = 49.6 |
| R12 = −5.926 | D12 = 0.01 | | |
| R13 = 9.056 | D13 = 0.34 | N8 = 1.74950 | ν8 = 35.3 |
| R14 = −1.237 | D14 = 0.09 | N9 = 1.84666 | ν9 = 23.9 |
| R15 = −2.946 | D15 = Variable | | |
| R16 = 0.0 (Stop) | D16 = 0.09 | | |
| R17 = 1.238 | D17 = 0.35 | N10 = 1.65160 | ν10 = 58.6 |
| R18 = −1.835 | D18 = 0.11 | N11 = 1.80610 | ν11 = 40.9 |
| R19 = 2.262 | D19 = 0.01 | | |
| R20 = 0.903 | D20 = 0.18 | N12 = 1.69680 | ν12 = 55.5 |
| R21 = 1.390 | D21 = 0.09 | | |
| R22 = 4.567 | D22 = 0.09 | N13 = 1.80518 | ν13 = 25.4 |
| R23 = 0.763 | D23 = 0.18 | | |
| R24 = 12.128 | D24 = 0.26 | N14 = 1.72342 | ν14 = 38.0 |
| R25 = −1.264 | | | |

| Focal Length | Variable Separation | | | Image Magnification | | |
|---|---|---|---|---|---|---|
| | D5 | D10 | D15 | 2nd Group | 3rd Group | 4th Group |
| 1.00 | 0.054 | 1.753 | 0.027 | −0.325 | −1.117 | 0.473 |
| 3.07 | 1.948 | 0.608 | 1.066 | −0.644 | −1.844 | 0.444 |
| 5.87 | 2.809 | 0.088 | 1.859 | −1.165 | −1.662 | 0.521 |

TABLE 3

| F = 1.00–5.86 | FNo. = 1:1.4–2.0 | 2ω = 53.1°–9.74° | |
|---|---|---|---|
| R1 = 8.948 | D1 = 0.23 | N1 = 1.84666 | ν1 = 23.9 |
| R2 = 4.072 | D2 = 0.86 | N2 = 1.60311 | ν2 = 60.7 |
| R3 = −12.429 | D3 = 0.01 | | |
| R4 = 3.762 | D4 = 0.45 | N3 = 1.60311 | ν3 = 60.7 |
| R5 = 12.372 | D5 = Variable | | |
| R6 = 3.626 | D6 = 0.10 | N4 = 1.88300 | ν4 = 40.8 |
| R7 = 1.154 | D7 = 0.60 | | |
| R8 = −1.090 | D8 = 0.10 | N5 = 1.69680 | ν5 = 55.5 |
| R9 = 1.712 | D9 = 0.45 | N6 = 1.84666 | ν6 = 23.9 |
| R10 = −2.917 | D10 = Variable | | |
| R11 = −1.701 | D11 = 0.10 | N7 = 1.69680 | ν7 = 55.5 |
| R12 = −6.440 | D12 = Variable | | |
| R13 = 0.0 (Stop) | D13 = 0.12 | | |
| R14 = 12.966 | D14 = 0.45 | N8 = 1.69680 | ν8 = 55.5 |
| R15 = −2.619 | D15 = 0.02 | | |
| R16 = 2.325 | D16 = 0.45 | N9 = 1.69680 | ν9 = 55.5 |
| R17 = −62.217 | D17 = 0.26 | | |
| R18 = −2.478 | D18 = 0.12 | N10 = 1.84666 | ν10 = 23.9 |
| R19 = −41.365 | D19 = 0.02 | | |

TABLE 3-continued

| R20 = 2.445 | D20 = 0.50 | N11 = 1.60311 | $\nu11$ = 60.7 |
| R21 = −5.038 | D21 = 0.30 | | |
| R22 = 1.692 | D22 = 0.12 | N12 = 1.80518 | $\nu12$ = 25.4 |
| R23 = 0.970 | D23 = 0.33 | | |
| R24 = 2.096 | D24 = 0.32 | N13 = 1.69680 | $\nu13$ = 55.5 |
| R25 = 12.152 | D25 = Variable | | |
| R26 = 0.0 | D26 = 0.55 | N14 = 1.51633 | $\nu14$ = 64.1 |
| R27 = 0.0 | | | |

| Focal Length | Variable Separation | | | | Image Magnification | | |
|---|---|---|---|---|---|---|---|
| | D5 | D10 | D12 | D25 | 2nd Group | 3rd Group | 4th Group |
| 1.00 | 0.10 | 0.18 | 1.58 | 0.73 | −0.444 | 0.523 | −0.833 |
| 2.55 | 1.49 | 0.29 | 0.71 | 1.49 | −0.812 | 0.478 | −1.276 |
| 5.86 | 2.41 | 0.29 | 0.19 | 2.01 | −1.809 | 0.400 | −1.571 |

TABLE 4

F = 1.00 = 6.41  FNo. = 1:1.4−2.0  $2\omega$ = 53.1°−9.0°

| R1 = 9.503 | D1 = 0.18 | N1 = 1.80518 | $\nu1$ = 25.4 |
| R2 = 3.898 | D2 = 1.00 | N2 = 1.51633 | $\nu2$ = 64.1 |
| R3 = −8.368 | D3 = 0.01 | | |
| R4 = 3.594 | D4 = 0.45 | N3 = 1.69680 | $\nu3$ = 55.5 |
| R5 = 6.631 | D5 = Variable | | |
| R6 = 13.096 | D6 = 0.09 | N4 = 1.77250 | $\nu4$ = 49.6 |
| R7 = 1.366 | D7 = 0.34 | | |
| R8 = −2.808 | D8 = 0.09 | N5 = 1.77250 | $\nu5$ = 49.6 |
| R9 = 1.396 | D9 = 0.36 | N6 = 1.84666 | $\nu6$ = 23.9 |
| R10 = −7.638 | D10 = Variable | | |
| R11 = 2.340 | D11 = 0.55 | N7 = 1.77250 | $\nu7$ = 49.6 |
| R12 = −1.606 | D12 = 0.09 | N8 = 1.84666 | $\nu8$ = 23.9 |
| R13 = −13.579 | D13 = 0.09 | | |
| R14 = 0.0 (Stop) | D14 = Variable | | |
| R15 = −1.790 | D15 = 0.09 | N9 = 1.77250 | $\nu9$ = 49.6 |
| R16 = 29.506 | D16 = Variable | | |
| R17 = 15.695 | D17 = 0.36 | N10 = 1.69680 | $\nu10$ = 55.5 |
| R18 = −2.547 | D18 = 0.01 | | |
| R19 = 2.956 | D19 = 0.36 | N11 = 1.69680 | $\nu11$ = 55.5 |
| R20 = −33.467 | D20 = 0.01 | | |
| R21 = 2.159 | D21 = 0.32 | N12 = 1.69680 | $\nu12$ = 55.5 |
| R22 = 5.737 | D22 = 0.31 | | |
| R23 = −2.844 | D23 = 0.09 | N13 = 1.80518 | $\nu13$ = 25.4 |
| R24 = 2.891 | D24 = 0.18 | | |
| R25 = 20.020 | D25 = 0.36 | N14 = 1.51633 | $\nu14$ = 64.1 |
| R26 = −5.733 | D26 = 0.01 | | |
| R27 = 2.588 | D27 = 0.36 | N15 = 1.51633 | $\nu15$ = 64.1 |
| R28 = −2.716 | | | |

| Focal Length | Variable Separation | | | | Image Magnification | | | |
|---|---|---|---|---|---|---|---|---|
| | D | D10 | D14 | D16 | 2nd Group | 3rd Group | 4th Group | 5th Group |
| 1.00 | 0.139 | 1.569 | 0.297 | 1.182 | −0.450 | −1.768 | −0.424 | −0.494 |
| 3.21 | 2.152 | 1.086 | 1.526 | 0.436 | −1.008 | −1.402 | −0.766 | −0.494 |
| 6.41 | 2.596 | 0.114 | 2.842 | 0.091 | −1.388 | −1.686 | −0.924 | −0.494 |

TABLE 5

| Focal Length of Entire System | Shortest Focal Length Setting | Intermediate Focal Length Setting | Longest Focal Length Setting |
|---|---|---|---|
| F | 1.000 | 1.679 | 5.736 |
| f1 | 5.005 | | |
| f2 | −1.273 | | |
| f3 | −4.461 | | |
| f4 | 1.731 | | |
| e1 | 0.727 | 2.091 | 3.455 |
| e2 | 1.135 | 1.358 | 2.395 |
| e3 | 2.167 | 1.943 | 0.906 |
| β2 | −0.423 | −0.775 | −4.576 |
| β3 | 0.602 | 0.552 | 0.320 |

TABLE 6

F = 1.00−5.74  FNO = 1:1.4−2.0  $2\omega$ = 53.1°−10.0°

| R1 = 8.133 | D1 = 0.18 | N1 = 1.84666 | $\nu1$ = 23.9 |
| R2 = 4.027 | D2 = 1.00 | N2 = 1.60311 | $\nu2$ = 60.7 |
| R3 = −14.226 | D3 = 0.01 | | |

TABLE 6-continued

| R4 = 2.968 | D4 = 0.55 | N3 = 1.60311 | $\nu3$ = 60.7 |
| R5 = 6.486 | D5 = Variable | | |
| R6 = −49.106 | D6 = 0.10 | N4 = 1.88300 | $\nu4$ = 40.8 |
| R7 = 0.946 | D7 = 0.49 | | |
| R8 = −4.162 | D8 = 0.10 | N5 = 1.63854 | $\nu5$ = 55.4 |
| R9 = 0.838 | D9 = 0.36 | N6 = 1.75520 | $\nu6$ = 27.5 |
| R10 = −7.394 | D10 = Variable | | |
| R11 = −2.453 | D11 = 0.10 | N7 = 1.69350 | $\nu7$ = 53.2 |
| R12 = −12.050 | D12 = Variable | | |
| R13 = 13.214 | D13 = 0.45 | N8 = 1.69680 | $\nu8$ = 55.5 |
| R14 = −2.574 | D14 = 0.02 | | |
| R15 = 2.298 | D15 = 0.45 | N9 = 1.60311 | $\nu9$ = 60.7 |
| R16 = −15.574 | D16 = 0.22 | | |
| R17 = −2.202 | D17 = 0.12 | N10 = 1.84666 | $\nu10$ = 23.9 |
| R18 = 50.010 | D18 = 0.02 | | |
| R19 = 3.359 | D19 = 0.55 | N11 = 1.69680 | $\nu11$ = 55.5 |
| R20 = −3.311 | D20 = 0.32 | | |
| R21 = 1.315 | D21 = 0.12 | N12 = 1.80518 | $\nu12$ = 25.4 |
| R22 = 0.921 | D22 = 0.32 | | |
| R23 = 1.742 | D23 = 0.32 | N13 = 1.69680 | $\nu13$ = 55.5 |
| R24 = 3.968 | D24 = Variable | | |
| R25 = 0.0 | D25 = 0.55 | N14 = 1.51633 | $\nu14$ = 64.1 |
| R26 = 0.0 | | | |

| Focal Length | Variable Separation | | |
|---|---|---|---|
| | D5 | D10 | D12 |
| 1.00 | 0.10 | 0.22 | 1.46 |
| 1.68 | 1.47 | 0.44 | 1.24 |
| 5.74 | 2.83 | 1.48 | 0.20 |

TABLE 7

| Focal Length of Entire System | Shortest Focal Length Setting | Intermediate Focal Length Setting | Longest Focal Length Setting |
|---|---|---|---|
| F | 1.000 | 2.352 | 5.994 |
| f1 | 4.788 | | |
| f2 | −1.455 | | |
| f3 | −4.235 | | |
| f4 | −15.243 | | |
| f5 | 2.094 | | |
| e1 | 0.727 | 1.826 | 2.741 |
| e2 | 0.902 | 1.312 | 1.305 |
| e3 | 0.864 | 0.454 | 0.461 |
| e4 | 2.540 | 1.680 | 0.964 |
| β2 | −0.558 | −0.965 | −2.457 |
| β3 | 0.572 | 0.504 | 0.401 |
| β4 | 0.851 | 0.856 | 0.836 |
| β5 | −0.769 | −1.180 | −1.522 |

TABLE 8

F = 1.00−5.99  FNo. = 1:1.4−2.0  $2\omega$ = 53.1°−9.5°

| R1 = 8.513 | D1 = 0.23 | N1 = 1.84666 | $\nu1$ = 23.9 |
| R2 = 3.826 | D2 = 0.77 | N2 = 1.51633 | $\nu2$ = 64.1 |
| R3 = −7.757 | D3 = 0.01 | | |
| R4 = 2.560 | D4 = 0.36 | N3 = 1.60311 | $\nu3$ = 60.7 |
| R5 = 5.411 | D5 = Variable | | |
| R6 = 3.854 | D6 = 0.10 | N4 = 1.88300 | $\nu4$ = 40.8 |
| R7 = 1.259 | D7 = 0.52 | | |
| R8 = −1.532 | D8 = 0.10 | N5 = 1.63854 | $\nu5$ = 55.4 |
| R9 = 1.134 | D9 = 0.36 | N6 = 1.84666 | $\nu6$ = 23.9 |
| R10 = −23.334 | D10 = Variable | | |
| R11 = −1.079 | D11 = 0.10 | N7 = 1.69680 | $\nu7$ = 55.5 |
| R12 = −1.766 | D12 = Variable | | |
| R13 = 22.064 | D13 = 0.14 | N8 = 1.60311 | $\nu8$ = 60.7 |
| R14 = 6.474 | D14 = Variable | | |
| R15 = 0.0 (Stop) | D15 = 0.02 | | |
| R16 = 6.823 | D16 = 0.50 | N9 = 1.69680 | $\nu9$ = 55.5 |
| R17 = −3.161 | D17 = 0.02 | | |
| R18 = 3.266 | D18 = 0.36 | N10 = 1.60311 | $\nu10$ = 60.7 |
| R19 = −55.644 | D19 = 0.25 | | |
| R20 = −2.706 | D20 = 0.12 | N11 = 1.84666 | $\nu11$ = 23.9 |
| R21 = −9.724 | D21 = 0.02 | | |
| R22 = 2.779 | D22 = 0.45 | N12 = 1.69680 | $\nu12$ = 55.5 |
| R23 = −12.375 | D23 = 0.58 | | |
| R24 = 2.530 | D24 = 0.12 | N13 = 1.80518 | $\nu13$ = 25.4 |
| R25 = 1.176 | D25 = 0.48 | | |
| R26 = 2.021 | D26 = 0.32 | N14 = 1.69680 | $\nu14$ = 55.5 |

TABLE 8-continued

| R27 = 25.408 | D27 = 0.64 | | |
|---|---|---|---|
| R28 = 0.0 | D28 = 0.55 | N15 = 1.51633 | $\nu 15 = 64.1$ |
| R29 = 0.0 | | | |

| Focal Length | Variable Separation | | | |
|---|---|---|---|---|
| | D5 | D10 | D12 | D14 |
| 1.00 | 0.11 | 0.37 | 0.58 | 1.82 |
| 2.35 | 1.20 | 0.78 | 0.17 | 0.96 |
| 5.99 | 2.12 | 0.77 | 0.18 | 0.25 |

TABLE 9

F = 1.0–6.0   FNo. 1:1.4–1.8   $2\omega = 52.0°–9.30°$

| R1 = 8.655 | D1 = 0.18 | N1 = 1.80518 | $\nu 1 = 25.4$ |
|---|---|---|---|
| R2 = 3.697 | D2 = 0.95 | N2 = 1.51633 | $\nu 2 = 64.1$ |
| R3 = −40.568 | D3 = 0.01 | | |
| R4 = 2.631 | D4 = 0.56 | N3 = 1.69680 | $\nu 3 = 55.5$ |
| R5 = 5.902 | D5 = Variable | | |
| R6 = 11.689 | D6 = 0.09 | N4 = 1.81600 | $\nu 4 = 46.6$ |
| R7 = 1.381 | D7 = 0.47 | | |
| R8 = −1.587 | D8 = 0.09 | N5 = 1.81600 | $\nu 5 = 46.6$ |
| R9 = 5.293 | D9 = 0.34 | N6 = 1.92286 | $\nu 6 = 21.3$ |
| R10 = −4.247 | D10 = Variable | | |
| R11 = 12.109 | D11 = 0.31 | N7 = 1.71300 | $\nu 7 = 53.8$ |
| R12 = −4.001 | D12 = 0.01 | | |
| R13 = 3.319 | D13 = 0.55 | N8 = 1.69680 | $\nu 8 = 55.5$ |
| R14 = −2.042 | D14 = 0.09 | N9 = 1.84666 | $\nu 9 = 23.9$ |
| R15 = −6.354 | D15 = Variable | | |
| R16 = 0.0 (Stop) | D16 = Variable | | |
| R17 = 1.134 | D17 = 0.20 | N10 = 1.59551 | $\nu 10 = 39.2$ |
| R18 = 2.096 | D18 = 0.01 | | |
| R19 = 0.843 | D19 = 0.20 | N11 = 1.59551 | $\nu 11 = 39.2$ |
| R20 = 1.067 | D20 = 0.13 | | |
| R21 = 4.237 | D21 = 0.09 | N12 = 1.92286 | $\nu 12 = 21.3$ |
| R22 = 0.723 | D22 = 0.23 | | |
| R23 = 4.201 | D23 = 0.27 | N13 = 1.64769 | $\nu 13 = 33.8$ |
| R24 = −1.510 | D24 = −1.14 | | |
| R25 = 0.0 | | | |

| Focal Length | Variable Separation | | | | Image Magnification | | |
|---|---|---|---|---|---|---|---|
| | D5 | D10 | D15 | D16 | 2nd Group | 3rd Group | 4th Group |
| 1.00 | 0.07 | 2.18 | 0.02 | 0.09 | −0.368 | −0.763 | 0.652 |
| 2.31 | 1.14 | 1.12 | 1.08 | 0.37 | −0.538 | −1.120 | 0.702 |
| 6.00 | 2.17 | 0.09 | 2.11 | 0.58 | −0.974 | −1.532 | 0.737 |

TABLE 10

F = 1.00–5.40   FNo. = 1:1.4–2.0   $2\omega = 53.1°–10.6°$

| R1 = 17.539 | D1 = 0.20 | N1 = 1.80518 | $\nu 1 = 25.4$ |
|---|---|---|---|
| R2 = 6.542 | D2 = 0.75 | N2 = 1.51633 | $\nu 2 = 64.1$ |
| R3 = −7.155 | D3 = 0.01 | | |
| R4 = 4.207 | D4 = 0.55 | N3 = 1.51633 | $\nu 3 = 64.1$ |
| R5 = 16.468 | D5 = Variable | | |
| R6 = 3.194 | D6 = 0.10 | N4 = 1.77250 | $\nu 4 = 49.6$ |
| R7 = 1.244 | D7 = 0.46 | | |
| R8 = −1.244 | D8 = 0.10 | N5 = 1.77250 | $\nu 5 = 49.6$ |
| R9 = 2.212 | D9 = 0.32 | N6 = 1.84666 | $\nu 6 = 23.9$ |
| R10 = −4.498 | D10 = Variable | | |
| R11 = 9.376 | D11 = 0.27 | N7 = 1.77250 | $\nu 7 = 49.6$ |
| R12 = −4.661 | D12 = 0.01 | | |
| R13 = 2.879 | D13 = 0.55 | N8 = 1.77250 | $\nu 8 = 49.6$ |
| R14 = −1.635 | D14 = 0.09 | N9 = 1.84666 | $\nu 9 = 23.9$ |
| R15 = −24.739 | D15 = Variable | | |
| R16 = 0.0 (Stop) | D16 = Variable | | |
| R17 = 2.143 | D17 = 0.27 | N10 = 1.51633 | $\nu 10 = 64.1$ |
| R18 = −4.722 | D18 = 0.09 | N11 = 1.74950 | $\nu 11 = 35.3$ |
| R19 = 3.350 | D19 = 0.51 | | |
| R20 = 0.948 | D20 = 0.09 | N12 = 1.80518 | $\nu 12 = 25.4$ |
| R21 = 0.823 | D21 = 0.18 | | |
| R22 = 2.369 | D22 = 0.36 | N13 = 1.64769 | $\nu 13 = 33.8$ |
| R23 = −8.949 | | | |

| Focal Length | Variable Separation | | | | Image Magnification | | |
|---|---|---|---|---|---|---|---|
| | D5 | D10 | D15 | D16 | 2nd Group | 3rd Group | 4th Group |
| 1.00 | 0.03 | 2.27 | 0.09 | 0.04 | −0.318 | −0.773 | 0.677 |
| 2.30 | 1.12 | 1.18 | 1.18 | 0.24 | −0.438 | −1.214 | 0.721 |
| 5.40 | 2.21 | 0.09 | 1.74 | 0.09 | −0.700 | −2.245 | 0.572 |

TABLE 11

| Focal Length of Entire System | Shortest Focal Length Setting | Intermediate Focal Length Setting | Longest Focal Length Setting |
|---|---|---|---|
| F | 1.0 | 2.553 | 5.860 |
| f1 | 5.160 | | |
| f2 | −1.364 | | |
| f3 | −3.345 | | |
| f4 | 1.735 | | |
| e1 | 0.727 | 2.116 | 3.042 |
| e2 | 1.080 | 1.186 | 1.190 |
| e3 | 2.221 | 1.348 | 0.833 |
| β2 | −0.444 | −0.812 | −1.808 |
| β3 | 0.523 | 0.478 | 0.400 |
| β4 | −0.834 | −1.276 | −1.571 |

TABLE 12

F = 1.00–5.86   FNo. = 1:1.4–2.0   $2\omega = 53.1°–9.74°$

| R1 = 8.948 | D1 = 0.23 | N1 = 1.84666 | $\nu 1 = 23.9$ |
|---|---|---|---|
| R2 = 4.072 | D2 = 0.86 | N2 = 1.60311 | $\nu 2 = 60.7$ |
| R3 = −12.429 | D3 = 0.01 | | |
| R4 = 3.762 | D4 = 0.45 | N3 = 1.60311 | $\nu 3 = 60.7$ |
| R5 = 12.372 | D5 = Variable | | |
| R6 = 3.626 | D6 = 0.10 | N4 = 1.88300 | $\nu 4 = 40.8$ |
| R7 = 1.154 | D7 = 0.60 | | |
| R8 = −1.090 | D8 = 0.10 | N5 = 1.69680 | $\nu 5 = 55.5$ |
| R9 = 1.712 | D9 = 0.45 | N6 = 1.84666 | $\nu 6 = 23.9$ |
| R10 = −2.917 | D10 = Variable | | |
| R11 = −1.701 | D11 = 0.10 | N7 = 1.69680 | $\nu 7 = 55.5$ |
| R12 = −6.440 | D12 = Variable | | |
| R13 = 0.0 (Stop) | D13 = 0.12 | | |
| R14 = 12.966 | D14 = 0.45 | N8 = 1.69680 | $\nu 8 = 55.5$ |
| R15 = −2.619 | D15 = 0.02 | | |
| R16 = 2.325 | D16 = 0.45 | N9 = 1.69680 | $\nu 9 = 55.5$ |
| R17 = −62.217 | D17 = 0.26 | | |
| R18 = −2.478 | D18 = 0.12 | N10 = 1.84666 | $\nu 10 = 23.9$ |
| R19 = −41.365 | D19 = 0.02 | | |
| R20 = 2.445 | D20 = 0.50 | N11 = 1.60311 | $\nu 11 = 60.7$ |
| R21 = −5.038 | D21 = 0.30 | | |
| R22 = 1.692 | D22 = 0.12 | N12 = 1.80518 | $\nu 12 = 25.4$ |
| R23 = 0.970 | D23 = 0.33 | | |
| R24 = 2.096 | D24 = 0.32 | N13 = 1.69680 | $\nu 13 = 55.5$ |
| R25 = 12.152 | D25 = Variable | | |
| R26 = 0.0 | D26 = 0.55 | N14 = 1.51633 | $\nu 14 = 64.1$ |
| R27 = 0.0 | | | |

| Focal Length | Variable Separation | | | |
|---|---|---|---|---|
| | D5 | D10 | D12 | D25 |
| 1.00 | 0.10 | 0.18 | 1.58 | 0.73 |
| 2.55 | 1.49 | 0.28 | 0.71 | 1.49 |
| 5.86 | 2.41 | 0.29 | 0.19 | 2.01 |

TABLE 13

| Focal Length of Entire System | Shortest Focal Length Setting | Intermediate Focal Length Setting | Longest Focal Length Setting |
|---|---|---|---|
| F | 1.00 | 2.886 | 6.137 |
| f1 | 5 | | |
| f2 | −1.899 | | |
| f3 | −2.764 | | |
| f4 | 1.8 | | |
| f5 | 19.162 | | |
| e1 | 0.727 | 1.796 | 2.509 |
| e2 | 0.727 | 0.987 | 0.772 |
| e3 | 2.709 | 1.273 | 0.704 |
| e4 | 0.727 | 1.903 | 2.687 |
| β2 | −0.800 | −1.456 | −3.209 |
| β3 | 0.400 | 0.328 | 0.240 |
| β4 | −0.701 | −1.354 | −1.790 |

TABLE 14

| f1 = 6.00 | f2 = -1.52 | f3 = 2.36 | f4 = -2.55 | f5 = 1.97 |
|---|---|---|---|---|
| | Wide Angle Setting | | Telephoto Setting | |
| e'1 | 0.727 | | 2.36 | |
| e'2 | 2.36 | | 0.727 | |
| e'3 | 0.727 | | 4.48 | |
| e'4 | 3.50 | | 1.38 | |

TABLE 15

F = 1.00-6.07   FNo. = 1:1.4-2.0   2ω = 53.1°-9.4°

| R1 = 9.638 | D1 = 0.18 | N1 = 1.80518 | ν1 = 25.4 |
|---|---|---|---|
| R2 = .4.344 | D2 = 0.59 | N2 = 1.51633 | ν2 = 64.1 |
| R3 = -10.699 | D3 = 0.01 | | |
| R4 = 5.020 | D4 = 0.27 | N3 = 1.69680 | ν3 = 55.5 |
| R5 = 18.938 | D5 = Variable | | |
| R6 = 8.375 | D6 = 0.09 | N4 = 1.77250 | ν4 = 49.6 |
| R7 = 1.695 | D7 = 0.51 | | |
| R8 = -2.082 | D8 = 0.09 | N5 = 1.71300 | ν5 = 53.8 |
| R9 = 2.508 | D9 = 0.36 | N6 = 1.84666 | ν6 = 23.9 |
| R10 = -27.927 | D10 = Variable | | |
| R11 = 10.671 | D11 = 0.36 | N7 = 1.77250 | ν7 = 49.6 |
| R12 = -3.840 | D12 = 0.01 | | |
| R13 = 3.006 | D13 = 0.57 | N8 = 1.69680 | ν8 = 55.5 |
| R14 = -3.163 | D14 = 0.09 | N9 = 1.84666 | ν9 = 23.9 |
| R15 = 18.363 | D15 = 0.09 | | |
| R16 = 0.0 (Stop) | D16 = Variable | | |
| R17 = -3.577 | D17 = 0.09 | N10 = 1.77250 | ν10 = 49.6 |
| R18 = 1.616 | D18 = 0.23 | N11 = 1.80518 | ν11 = 25.4 |
| R19 = 4.225 | D19 = Variable | | |
| R20 = -32.212 | D20 = 0.36 | N12 = 1.60311 | ν12 = 60.7 |
| R21 = -2.887 | D21 = 0.01 | | |
| R22 = 3.138 | D22 = 0.36 | N13 = 1.60311 | ν13 = 60.7 |
| R23 = 199.352 | D23 = 0.01 | | |
| R24 = 2.552 | D24 = 0.32 | N14 = 1.60311 | ν14 = 60.7 |
| R25 = 6.426 | D25 = 0.36 | | |
| R26 = -2.764 | D26 = 0.09 | N15 = 1.84666 | ν15 = 23.9 |
| R27 = 4.142 | D27 = 0.18 | | |
| R28 = 12.869 | D28 = 0.32 | N16 = 1.69680 | ν16 = 55.5 |
| R29 = -3.697 | D29 = 0.01 | | |
| R30 = 3.179 | D30 = 0.55 | N17 = 1.69680 | ν17 = 55.5 |
| R31 = -4.132 | | | |

| Focal Length | Variable Separation | | | | Image Magnification | | | |
|---|---|---|---|---|---|---|---|---|
| | D5 | D10 | D16 | D19 | 2nd Group | 3rd Group | 4th Group | 5th Group |
| 1.00 | 0.195 | 1.726 | 0.059 | 2.208 | -0.404 | -1.109 | -1.487 | -0.250 |
| 3.12 | 1.341 | 0.580 | 2.259 | 1.153 | -0.582 | -1.882 | -1.902 | -0.250 |
| 6.07 | 1.832 | 0.089 | 3.812 | 0.091 | -0.717 | -2.437 | -2.319 | -0.250 |

What we claim:

1. A zoom lens comprising:

at least four lens groups, said four lens groups including, from front to rear, a first lens group which has a positive refractive power, and a second lens group which has a negative refractive power and is composed of a negative lens having a concave surface directed toward the image and a cemented lens of a bi-concave lens and a bi-convex lens, wherein zooming is performed by moving said first lens group and at least one of the lens groups which are arranged on the image side of said second lens group independently of each other and said second lens group is fixed during zooming; and the image magnification of said second lens group is made to include unity of image magnification.

2. A zoom lens comprising:

at least four lens groups, said four lens groups being, from front to rear, a first lens group which has a positive refractive power, a second lens group which has a negative refractive power, a third lens group which has a negative refractive power, and a fourth lens group which has a positive or negative refractive power, wherein zooming is performed by holding said second lens group and said fourth lens group stationary while moving said first lens group and said third lens group, the paths of movement of said first lens group and said third lens group being different from each other.

3. A zoom lens according to claim 2, further including at least one lens group which is movable for zooming on the image side of said fourth lens group.

4. A zoom lens comprising:

four lens groups, said four lens groups being, from front to rear, a first lens group which has a positive refractive power, a second lens group which has a negative refractive power, a third lens group which has a negative refractive power and a fourth lens group which has a positive or negative refractive power, wherein zooming is performed by holding said second lens group stationary while moving said first, third and fourth lens groups.

5. A zoom lens according to claim 4, wherein the paths of movement of said first, third and fourth lens groups are different from one another.

6. A zoom lens comprising:

four lens groups, said four lens groups being, from front to rear, a first lens group which has a positive refractive power, a second lens group which has a negative refractive power, a third lens group which has a positive refractive power, and a fourth lens group which has a positive or negative refractive power and is the rearmost lens group, wherein zooming is performed by holding said second lens group stationary while moving said first, third and fourth lens groups, and said first lens group and said third lens group are moved as a unit and said fourth lens group moves independently of the first and third lens groups.

7. A zoom lens comprising:

five lens groups, said five lens groups being, from front to rear, a first lens group having a positive refractive power, a second lens group having a negative refractive power, a third lens group having a positive refractive power, a fourth lens group having a negative refractive power, and a fifth lens group having a positive refractive power, whereby zooming is performed by moving said first, said third and said fourth lens groups and wherein the second lens group is held stationary during a zooming and the third and fourth lens groups move independently.

8. A zoom lens according to claim 7, wherein as compared with zooming at a wide angle position, when zoomed at a telephoto position, said first and said third lens groups lie closer to the object, and said fourth lens group lies closer to the image.

9. A zoom lens according to claim 7 or 8, wherein said first lens group and said third lens group move as a unit.

10. A zoom lens comprising:

four lens groups, three lens groups on the object side of said four lens groups being, from front to rear, a first lens group which has a positive refractive power, a second lens group which has a negative refractive power and a third lens group which has a positive refractive power, wherein zooming is performed by holding the second lens group and a fourth group stationary while moving the first and third lens groups independently of each other, and the first and third lens groups lie closer to the object when zooming at a telephoto position than at a wide angle position.

11. A zoom lens according to claim 10, wherein the image magnification of the second lens group at zooming includes a unity magnification.

* * * * *